United States Patent
Yamada

(10) Patent No.: US 8,482,787 B2
(45) Date of Patent: Jul. 9, 2013

(54) IMAGE PROCESSING APPARATUS AND IMAGE PROCESSING METHOD

(75) Inventor: Michihiko Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1187 days.

(21) Appl. No.: 12/367,612

(22) Filed: Feb. 9, 2009

(65) Prior Publication Data
US 2009/0207424 A1    Aug. 20, 2009

(30) Foreign Application Priority Data
Feb. 13, 2008 (JP) .................................. 2008-032266

(51) Int. Cl.
*G06K 15/02*    (2006.01)
(52) U.S. Cl.
USPC ........................................... 358/1.2; 358/1.1
(58) Field of Classification Search
USPC .......................................... 358/1.2, 1.1, 1.9
See application file for complete search history.

(56) References Cited

FOREIGN PATENT DOCUMENTS
JP    2002-165079    *   6/2002
JP    2003-170636        6/2003

OTHER PUBLICATIONS

English translation of JP 2002-165079.*

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

The present invention provides an Image processing apparatus, etc. by which a user is able to set which of graphics, etc. and characters are enlarged to be printed on a priority basis. An image processing apparatus according to an embodiment of the present invention includes the steps of separating a character object from a graphic object included in an image and adjusting sizes of the character object and the graphic object according to a priority of an object designated by a user. The adjusting step enlarges the size of a high-priority object and reduces the size of a low-priority object. Furthermore, the adjusting step includes the step of automatically adjusting the sizes of the character object and the graphic object.

13 Claims, 35 Drawing Sheets

IMAGE PROCESSING APPARATUS AND IMAGE PROCESSING METHOD

BACKGROUND OF THE INVENTION

1. Field of the Invention

The present invention relates to a technology capable of adjusting the layout of an image including a graphic object and a character object.

2. Description of the Related Art

When original print data composed of small characters, there is a case that some characters are crushed and can not be read in a printed matter. Furthermore, when multiple pages are collectively printed on one page or printed on a small size paper, the pages themselves are reduced, so that objects included in the pages are also reduced. As a result, there is a problem that small characters become further smaller and difficult to be seen or small graphics are crushed and can not be seen.

Methods of solving this problem include, for example, a method disclosed in Japanese Patent Laid-Open No. 2003-170636. This method separates text and images when changing the size of paper, switches between changing and not changing the sizes of the images according to the size of paper, and then adjusts the character size so that the characters are contained on the paper to lay out a document again.

SUMMARY OF THE INVENTION

However, in a method disclosed in Japanese Patent Laid-Open No. 2003-170636, graphics or images are automatically reduced, so that there is a case that printed graphics, etc. become very difficult to see. Furthermore, there is a case that as a result of printing either graphics or characters on a priority basis, ones to which priority has not been given (characters when priority has been given to graphics) become difficult to see. In addition, in characters, there also is a case that their visibility becomes worse. Furthermore, in the case of synthetic image printing by which multiple pages are collectively printed on one page, there also is a case that graphics or characters in input image data are positioned outside a printable area in a synthetic image.

The present invention provides Image processing apparatus, etc. in which a user is able to set which of graphics, etc. and characters are enlarged to be printed on a priority basis.

In the first aspect of the present invention, there is provided an image processing apparatus reducing images to generate a synthetic image having a plurality of printable areas, comprising, a separating unit configured to separate a character object from a graphic object included in the synthetic image, a first metadata generating unit configured to generate first metadata from the graphic object, and a layout unit configured to lay out the synthetic image by adjusting a size of the graphic object so that the graphic object is arranged in one printable area included in the synthetic image, based on information about a size and an arrangement position of the graphic object included in the first metadata generated by the first metadata generating unit, according to a user instruction, and arranging the character object in a printable area except a region in which the graphic object has been arranged in a region of the synthetic image.

In the second aspect of the present invention, there is provided an image processing method of reducing images to generate a synthetic image having a plurality of printable area, the image processing method comprising the steps of, separating a character object from a graphic object included in the synthetic image, generating first metadata from the graphic object; and, laying out the synthetic image by adjusting a size of the graphic object so that the graphic object is arranged in one printable area included in the synthetic image, based on information about a size and an arrangement position of the graphic object included in the first metadata generated by the first metadata generating step, according to a user instruction, and arranging the character object in a printable area except a region in which the graphic object has been arranged in a region of the synthetic image.

In the third aspect of the present invention, there is provided a computer-readable medium having computer-executable instructions for performing an image processing method of reducing images to generate a synthetic image having a plurality of printable areas, the image processing method comprising the steps of, separating a character object from a graphic object included in the synthetic image, generating first metadata from the graphic object, and laying out the synthetic image by adjusting a size of the graphic object so that the graphic object is arranged in one printable area included in the synthetic image, based on information about a size and an arrangement position of the graphic object included in the first metadata generated by the first metadata generating step, according to a user instruction, and arranging the character object in a printable area except a region in which the graphic object has been arranged in a region of the synthetic image.

According to the present invention, a user is able to select whether to enlarge and display a character object or to enlarge and display a graphic object, so that the user is able to obtain a printed matter with a desired layout.

According to the present invention, the priorities of a character object and a graphic object can be set, so that the sizes of respective objects can be adjusted flexibly.

According to the present invention, after the sizes of a graphic object and a character object have been adjusted once, the sizes of respective objects can be adjusted again in consideration of a character size after the adjustment, so that it can be prevented that the character size is reduced too much and the characters become unreadable.

According to the present invention, a function of automatically adjusting the sizes of a graphic object and a character object is provided, so that even if a user designates nothing in particular, the user is able to obtain a printed matter with a high-quality layout of a certain level or more.

Further features of the present invention will become apparent from the following description of exemplary embodiments (with reference to the attached drawings).

DESCRIPTION OF THE EMBODIMENTS

Figure 1:
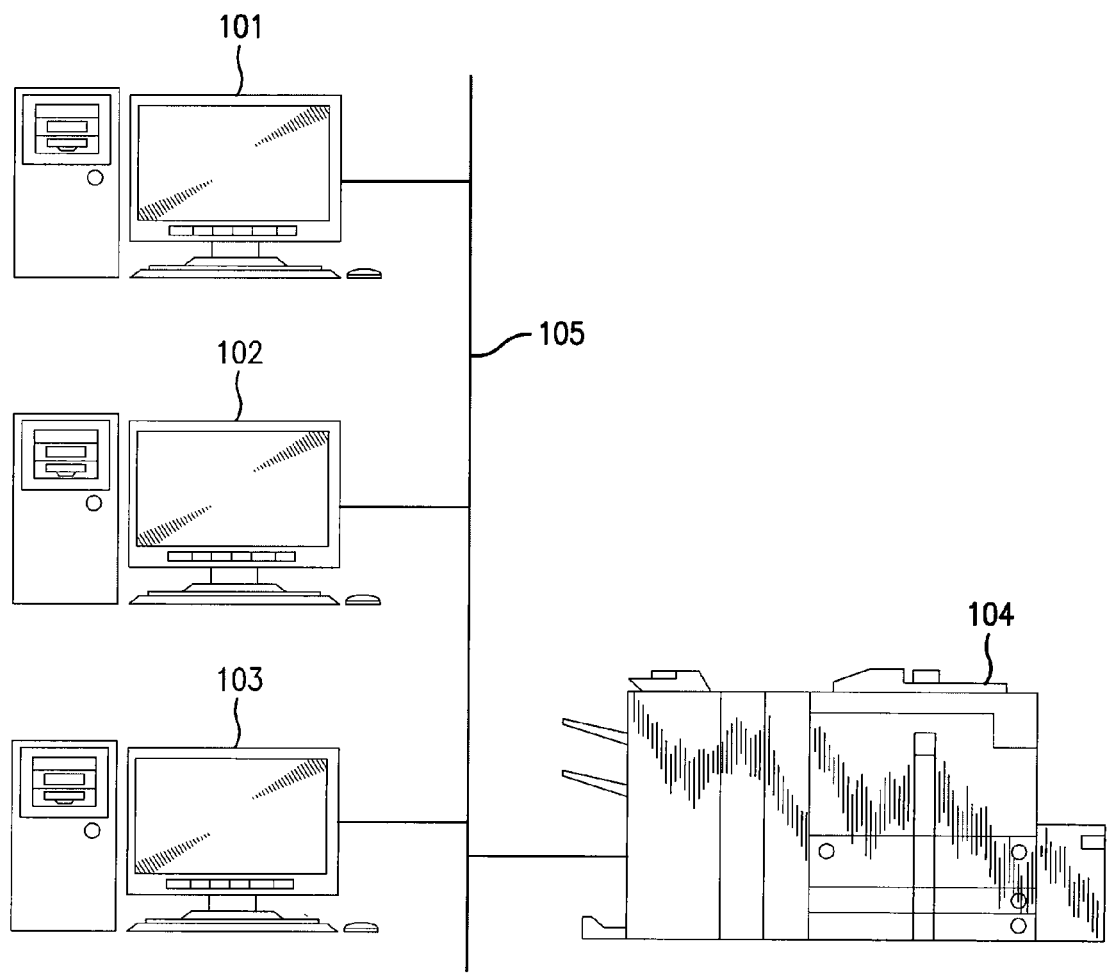
FIG. 1 is a block diagram showing a configuration example of an Image processing system provided with an Image processing apparatus according to the present invention.

Embodiments of the present invention will be described in detail below with reference to the drawings. FIG. 1 is a block diagram showing a configuration example of an Image processing system provided with an Image processing apparatus according to the present invention.

The Image processing system includes an Image processing apparatus 104 such as an MFP which is a multiple function peripheral having a copy function, a print function, a transmission function, etc., and clients 101 to 103 utilizing the Image processing apparatus 104. The Image processing apparatus 104 communicates with the clients 101 to 103 through a network 105 such as a LAN.

The clients 101 to 103 are information processors such as personal computers and each includes a CPU, a RAM, a ROM, a hard disk, an external storage device, a network interface, a display, a keyboard, a mouse, etc.

Note that the system configuration shown in FIG. 1 is an example and the number of Image processing apparatuses and the number of clients constituting the system are not limited to that shown in the figure.

Figure 2:
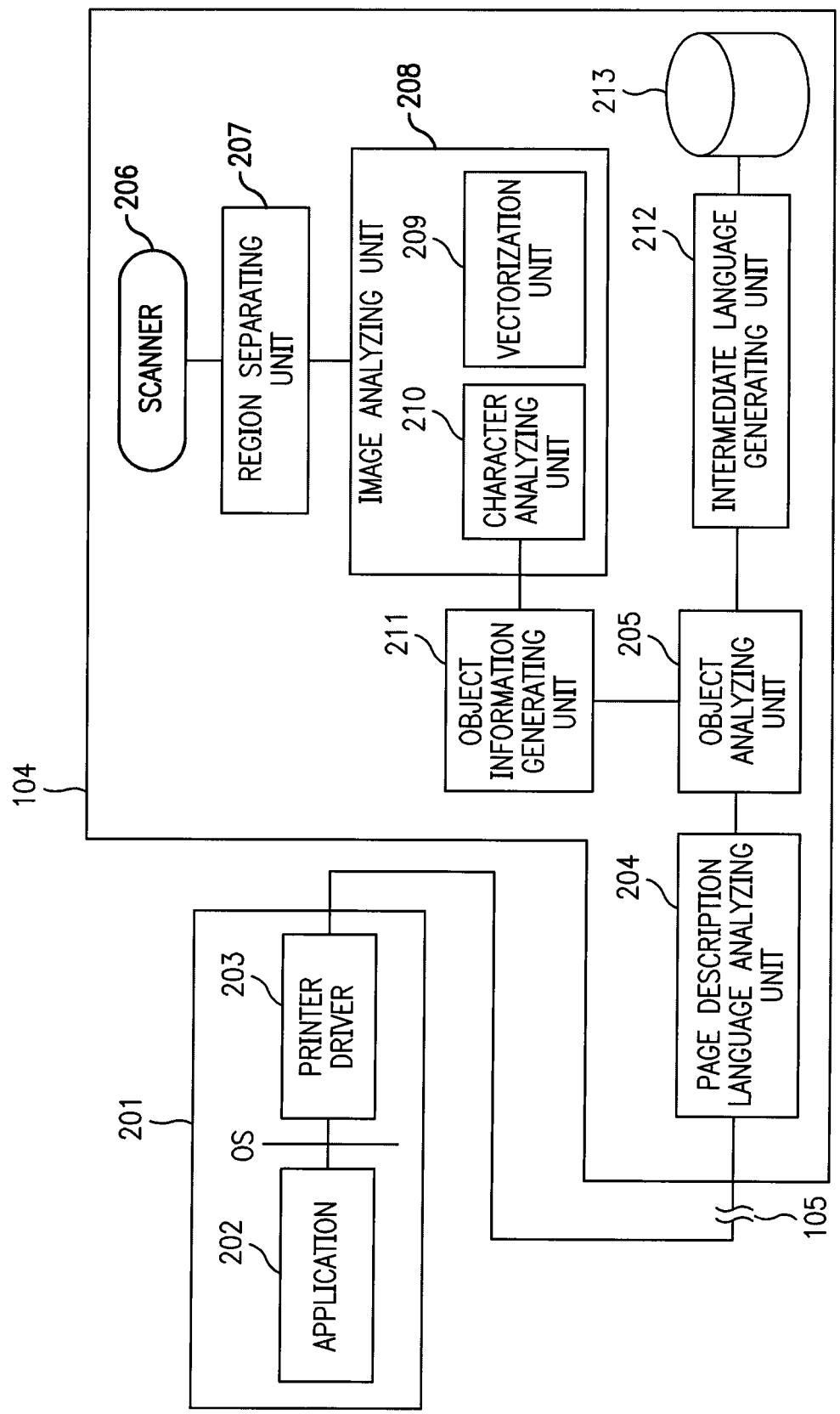
FIG. 2 is a block diagram showing the configuration of the Image processing system in more detail.

FIG. 2 is a block diagram showing in more detail the configuration of the Image processing system shown in FIG. 1. Reference numeral 201 denotes an operating system installed in a personal computer such as the client 101. The operating system 201 has a function of generally controlling an application 202 and a printer driver 203.

The Image processing apparatus 104 includes a page description language analyzing unit 204, an object analyzing unit 205, a scanner 206, a region separating unit 207, an image analyzing unit 208, an object information generating unit 211, an intermediate language generating unit 212, and a storage device 213 such as an HDD. The image analyzing unit 208 has a character analyzing unit 210 and a vectorization unit 209 therein.

The page description language analyzing unit 204 receives PDL (page description language) data from the printer driver 203 through the network 105 and analyzes it.

The object analyzing unit 205 analyzes objects included in pages based on the result of analysis of the PDL data.

The object information generating unit 211 generates object information based on the result of analysis of the objects.

On the other hand, the region separating unit 207 analyzes what is drawn in which part in an image based on image data (scan data) read by the scanner 206 and separates the image into multiple objects based on the result of the analysis. Specifically, the region separating unit 207 separates a region in which a character is drawn as a character object, separates a region in which a graphic is drawn as a graphic object, and separates a region in which a bitmap image is drawn as a bitmap image object.

The character analyzing unit 210 performs character analysis for the character object, and the vectorization unit 209 performs vectorization processing for the graphic object. The vectorization unit 209 does not perform vectorization processing for the bitmap image object.

The intermediate language generating unit 212 generates an intermediate language consisting of rendering commands.

In the storage device 213, print data is spooled. Spooling is to temporarily store print data in a storage device such as an HDD so that the print data can be processed at high speed.

Next, a series of processing, performed by the Image processing apparatus 104, including combining an intermediate language with metadata to generate print data and spooling the print data into the storage device 213 will be described.

Figure 3:
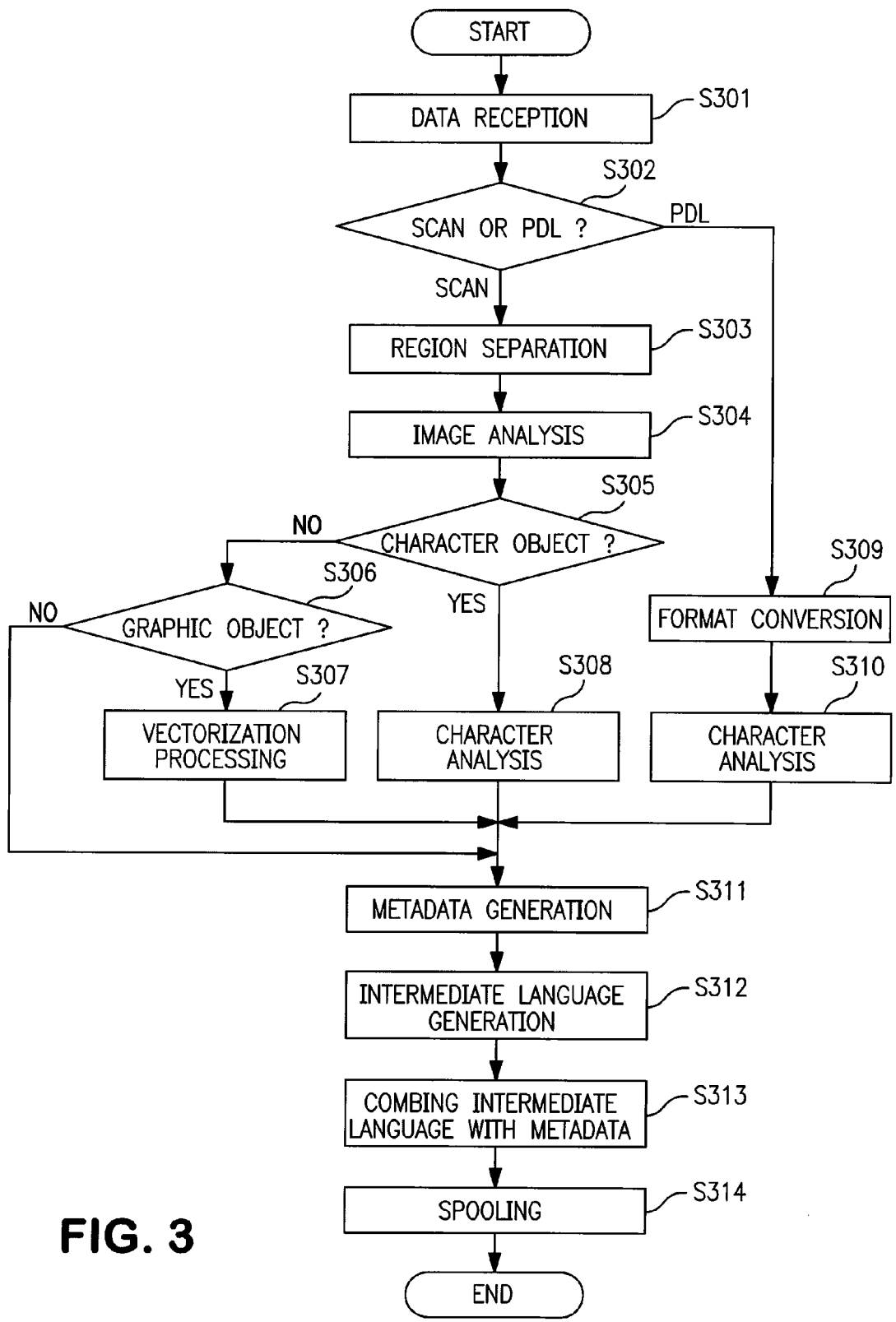
FIG. 3 is a flow chart showing a series of processing, performed by an Image processing apparatus 104, including combining an intermediate language with metadata to generate print data and spooling the print data into a storage device 213.

FIG. 3 is a flow chart showing the flow of the series of processing.

In step S301, the Image processing apparatus 104 receives PDL data or scan data from the client 101 or the scanner 206. In the following description, the CPU (not shown) built in the Image processing apparatus 104 generally controls respective components (204 to 213) included in the Image processing apparatus 104.

In step S302, the Image processing apparatus 104 determines whether the received data is scan data or PDL data, and proceeds to the processing of step S303 when it is scan data while proceeding to the processing of step S309 when it is PDL data.

When it is determined in step S302 that the received data is scan data, in step S303, the region separating unit 207 analyzes what is drawn in which part in an image based on the scan data and separates the image into multiple objects based on the result of the analysis.

Along the flow of steps S304, S305, and S308, the character analyzing unit 210 performs character analysis for a character object. In contrast to this, along the flow of steps S304 to S307, the vectorization unit 208 performs vectorization for a graphic object.

On the other hand, when it is determined in step S302 that the received data is PDL data, the page description language analyzing unit 204 analyzes the PDL data and performs format conversion in step S309. Next, the object analyzing unit 205 analyzes objects constituting a page and separates a character object based on the result of analysis of the PDL data. In step S310, the object analyzing unit 205 performs character analysis for the separated character object.

In step S311, the object information generating unit 211 generates metadata of each of the separated objects. The metadata is not data itself but information about the data. How to generate metadata will be described later.

In step S312, the intermediate language generating unit 212 generates an intermediate language.

In step S313, the Image processing apparatus 104 combines the intermediate language generated by the intermediate language generating unit 212 with the metadata generated by the object information generating unit 211 to generate spool data.

Figure 7:
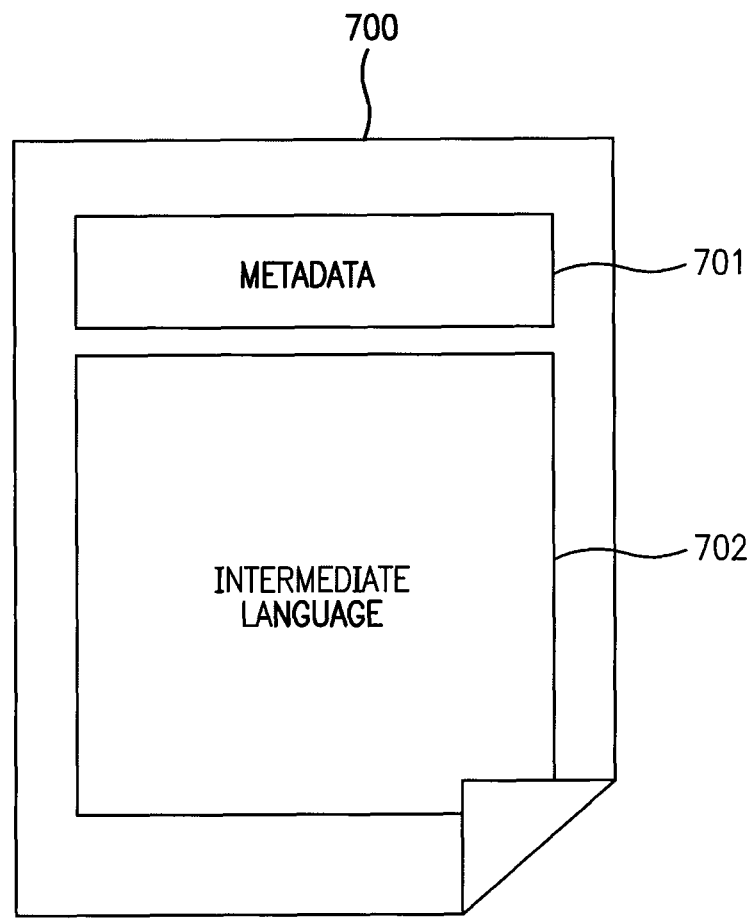
FIG. 7 schematically shows data to be spooled into a storage device 213.

FIG. 7 schematically shows data to be spooled into the storage device 213, that is, the spool data.

Spool data 700 includes metadata 701 generated by the object information generating unit 211 and intermediate language 702 generated by the intermediate language generating unit 212.

Finally, in step S314, generated print data is spooled in the storage device 213.

Next, details of processing (step S311 in FIG. 3) by which the object information generating unit 211 generates metadata will be described.

Figure 4:
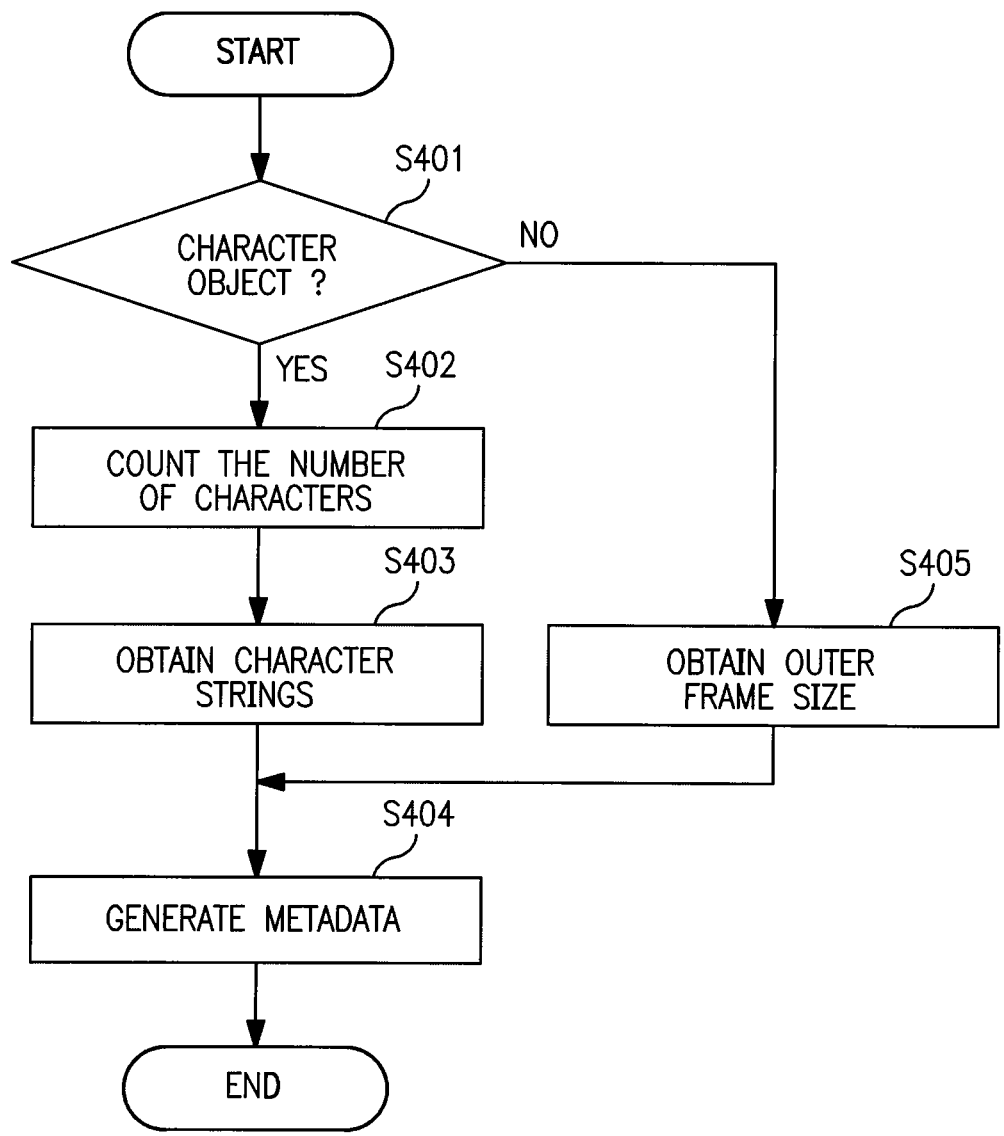
FIG. 4 is a flow chart showing a flow of processing (step S311 in FIG. 3) by which an object information generating unit 211 generates metadata.

FIG. 4 is a flow chart showing the flow of this processing.

In step S401, the object information generating unit 211 determines whether or not an input object is a character object and proceeds to the processing of step S402 when it is a character object.

In step S402, the object information generating unit 211 counts the number of characters included in the character object.

In step S403, the object information generating unit 211 obtains character strings in the character object.

On the other hand, when it is determined in step S401 that the input object is not a character object, the object information generating unit 211 obtains the outer frame size of a graphic object or a bitmap image object in step S405.

In step S404, the object information generating unit 211 generates metadata of the character object, the graphic object, or the bitmap image object based on the obtained character strings or outer frame size.

Figure 5:
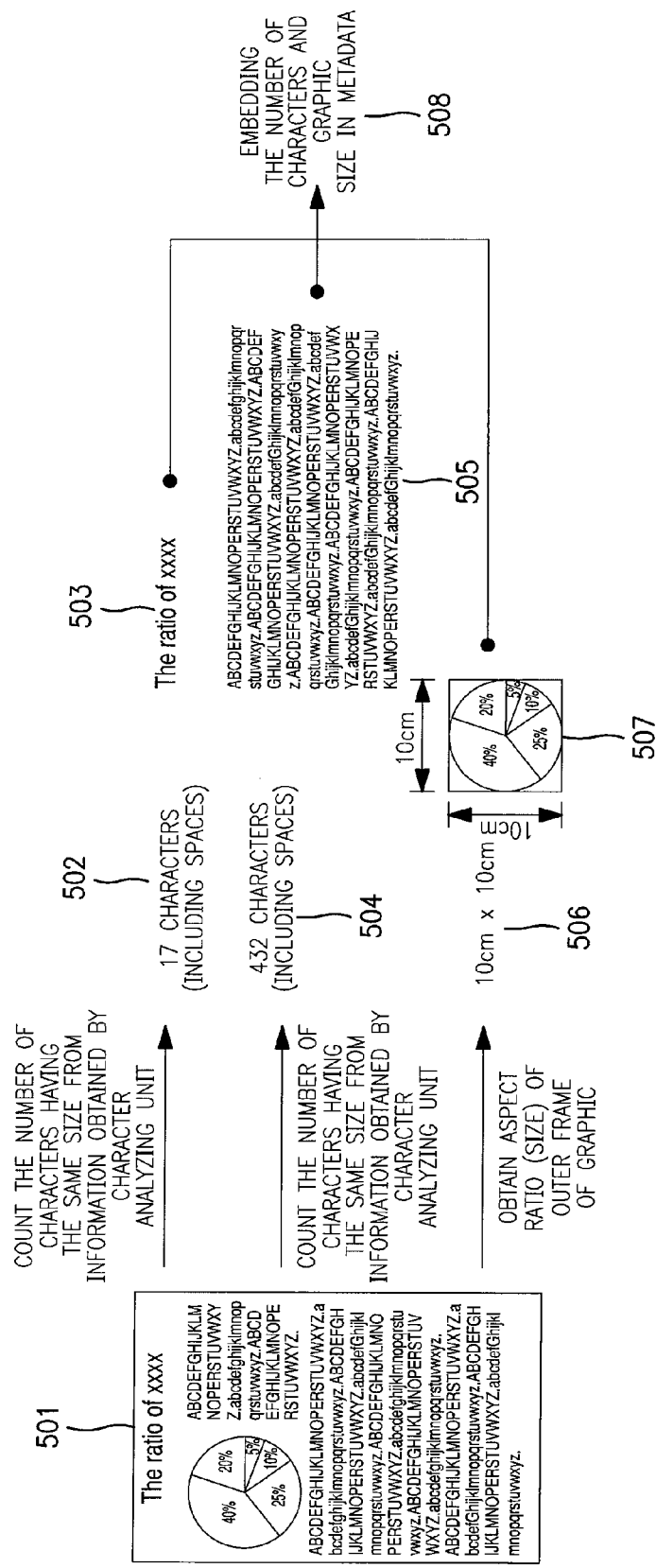
FIG. 5 shows a mechanism for obtaining the number of characters and the size of an outer frame from a separated character object, a graphic object, or an bitmap image object.
Figure 6:
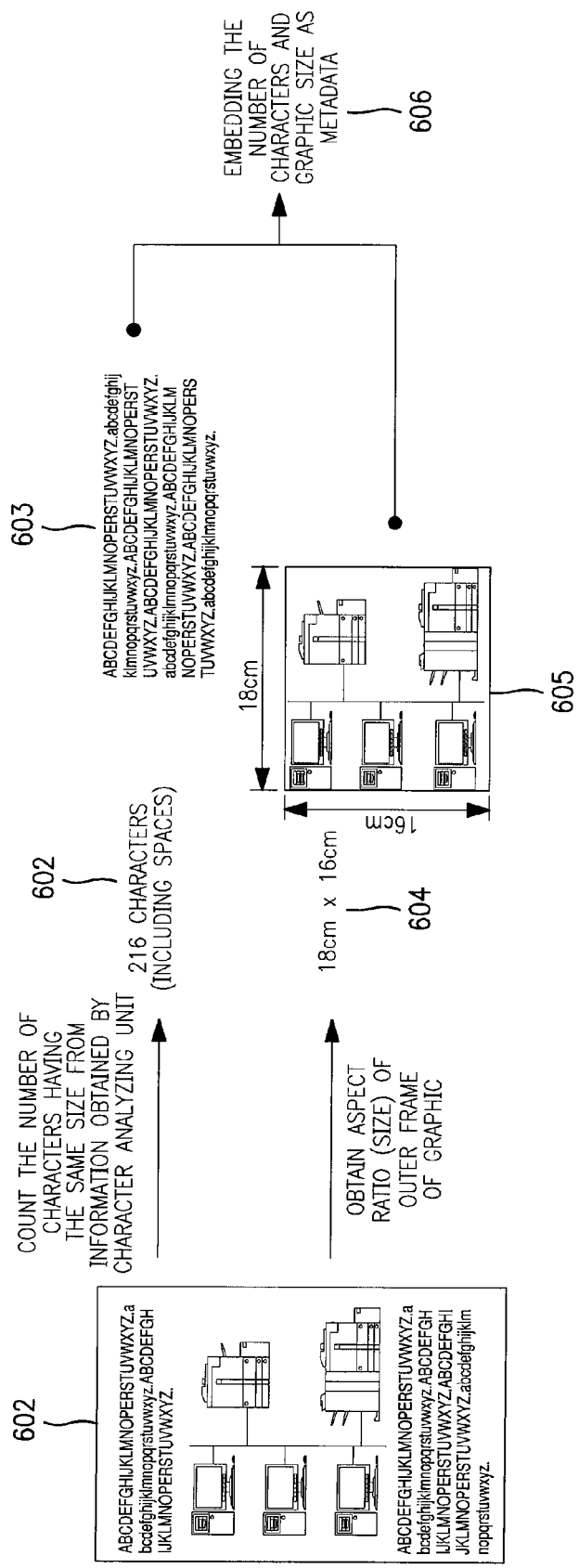
FIG. 6 shows a mechanism for obtaining the number of characters and the size of an outer frame from a separated character object, a graphic object, or an bitmap image object.

FIGS. 5 and 6 show a mechanism for obtaining the number of characters and the outer frame size from the separated character object, graphic object, or bitmap image object.

The character analyzing unit 210 analyzes a character object included in an original image 501 (FIG. 5) or an original image 601 (FIG. 6).

For example, in the example shown in FIG. 5, the object information generating unit 211 obtains data of the number of characters 502 (17 characters), data of the number of characters 504 (432 characters), and character string data 503 and 505. In the example shown in FIG. 6, the object information generating unit 211 obtains data of the number of characters 602 (216 characters) and character string data 603.

In addition, the object information generating unit 211 obtains data of the outer frame size (10 cm×10 cm) 506 of the graphic object 507 in the example shown in FIG. 5, or obtains data of the outer frame size (18 cm×16 cm) 604 of the bitmap image object 605 in the example shown in FIG. 6.

On the other hand, the vectorization unit 209 performs vectorization for the graphic object. The vectorization unit 209 does not perform vectorization processing for the bitmap image object, leaving it as it is.

In step S404, the object information generating unit 211 generates metadata using the above obtained data.

Next, an operation procedure for determining a print layout using a graphical user interface (GUI) will be described with reference to the drawings.

FIGS. 8 to 14 show screen examples of the GUI.

Figure 8:
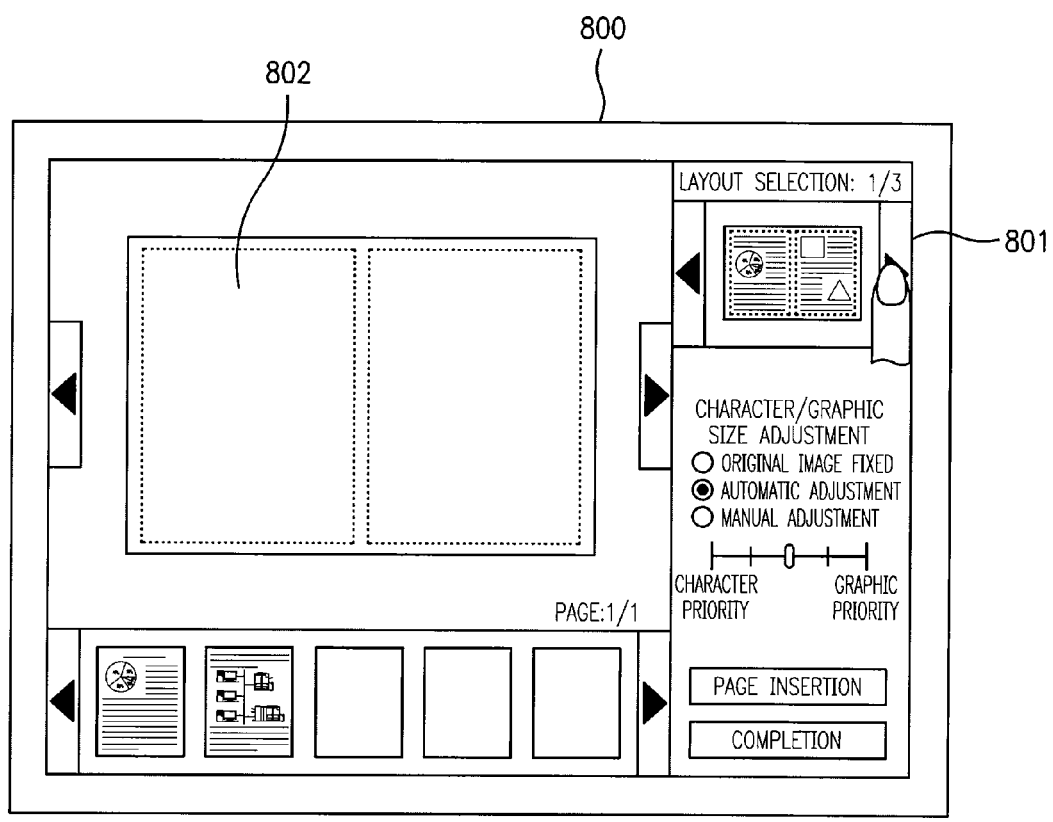
FIG. 8 shows a screen example for illustrating an operation procedure of determining a print layout.
Figure 9:
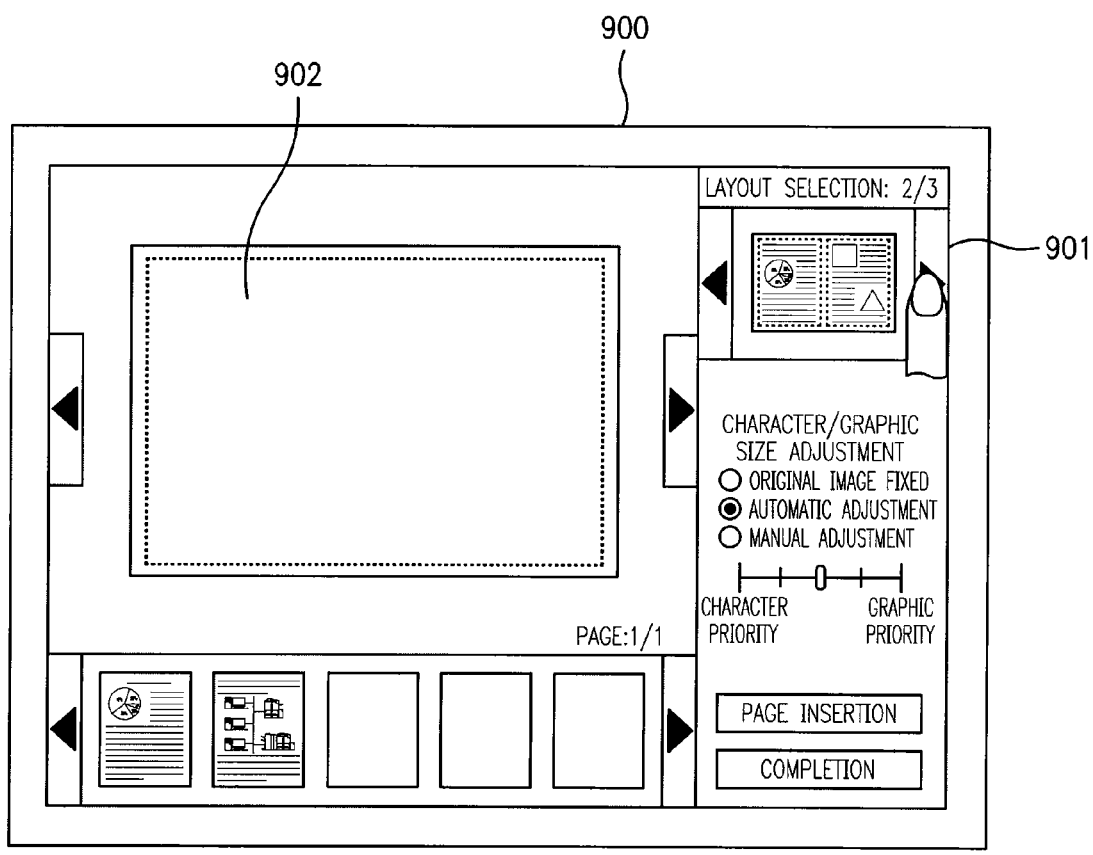
FIG. 9 shows a screen example for illustrating an operation procedure of determining a print layout.
Figure 10:
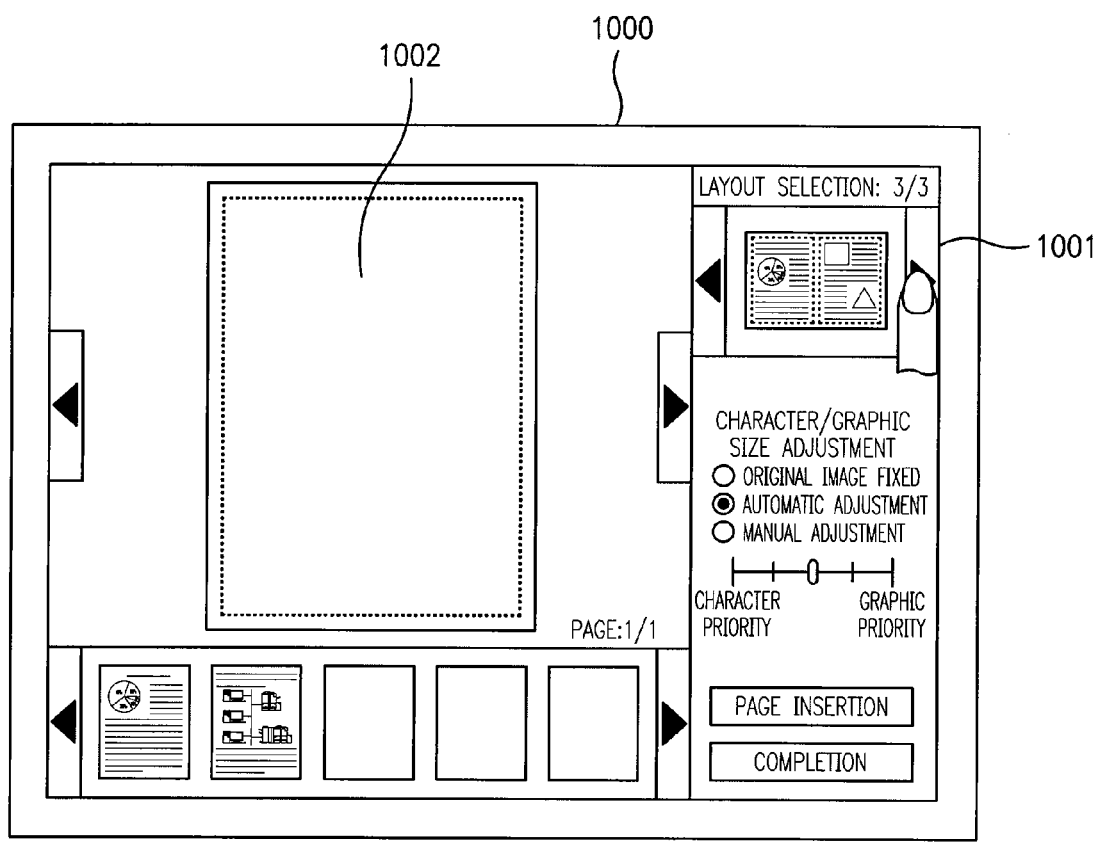
FIG. 10 shows a screen example for illustrating an operation procedure of determining a print layout.

With reference to FIGS. 8 to 10, a user is able to select a desired print layout by operating a vertical scroll bar 801 (FIG. 8), 901 (FIG. 9), or 1001 (FIG. 10). A selected print layout is displayed on a large scale on the screen as shown with 802 (FIG. 8), 902 (FIG. 9), or 1002 (FIG. 10).

In the example shown in FIG. 8, a layout diagram 802 in which two pages are arranged right and left to be one page is displayed on the screen 800 by selection (layout selection: 1/3) with the vertical scroll bar 801.

In the example shown in FIG. 9, a layout diagram 902 in which two pages are combined into one page (horizontally oriented page) is displayed on the screen 900 by selection (layout selection: 2/3) with the vertical scroll bar 901.

In the example shown in FIG. 10, a layout diagram 1002 in which two pages are combined into one page (vertically oriented page) is displayed on the screen 1000 by selection (layout selection: 3/3) with the vertical scroll bar 1001.

Figure 11:
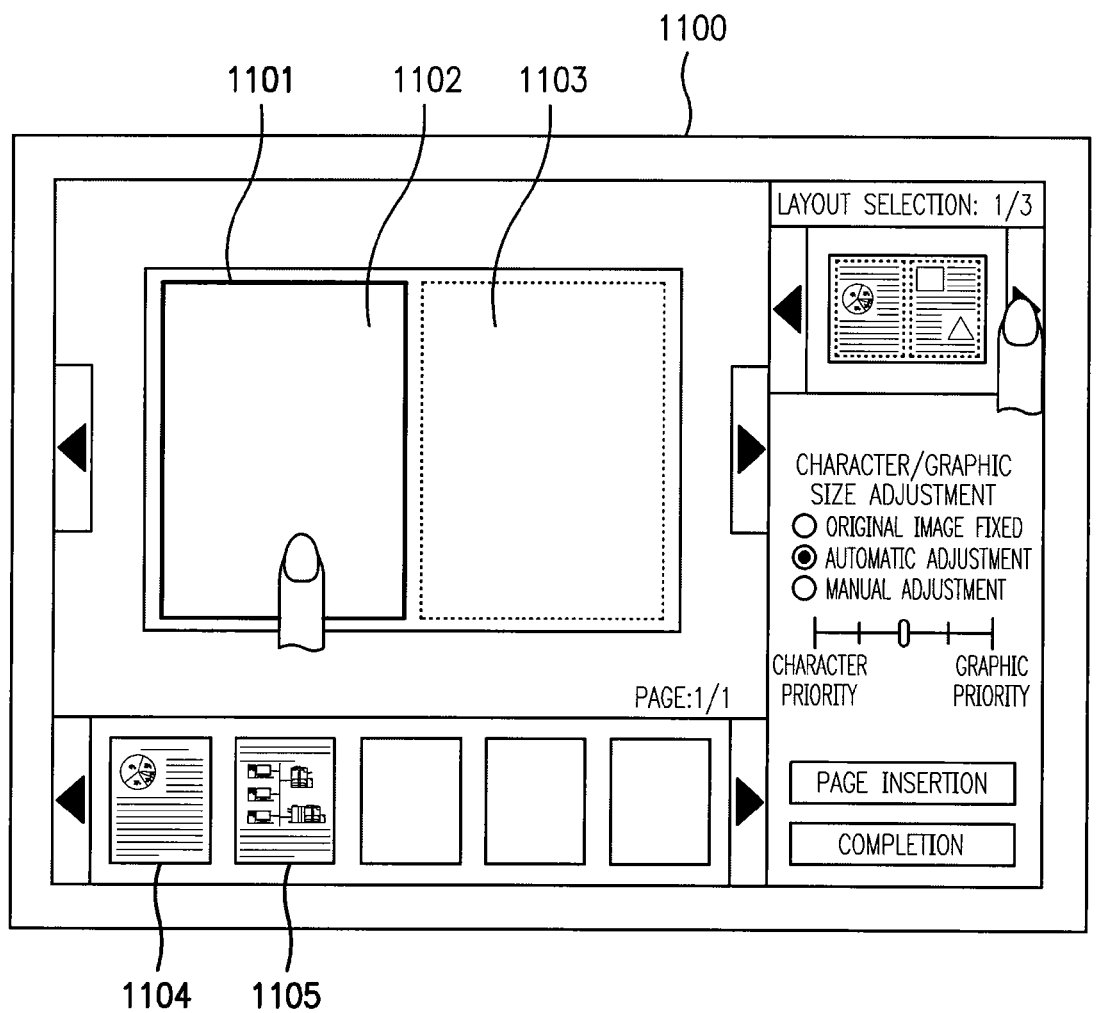
FIG. 11 shows a screen example for illustrating an operation procedure of determining a print layout.

FIG. 11 shows, like FIG. 8, a layout diagram 1101 displayed on the screen 1100 when a layout in which two pages are arranged right and left to be one page is selected.

Figure 12:
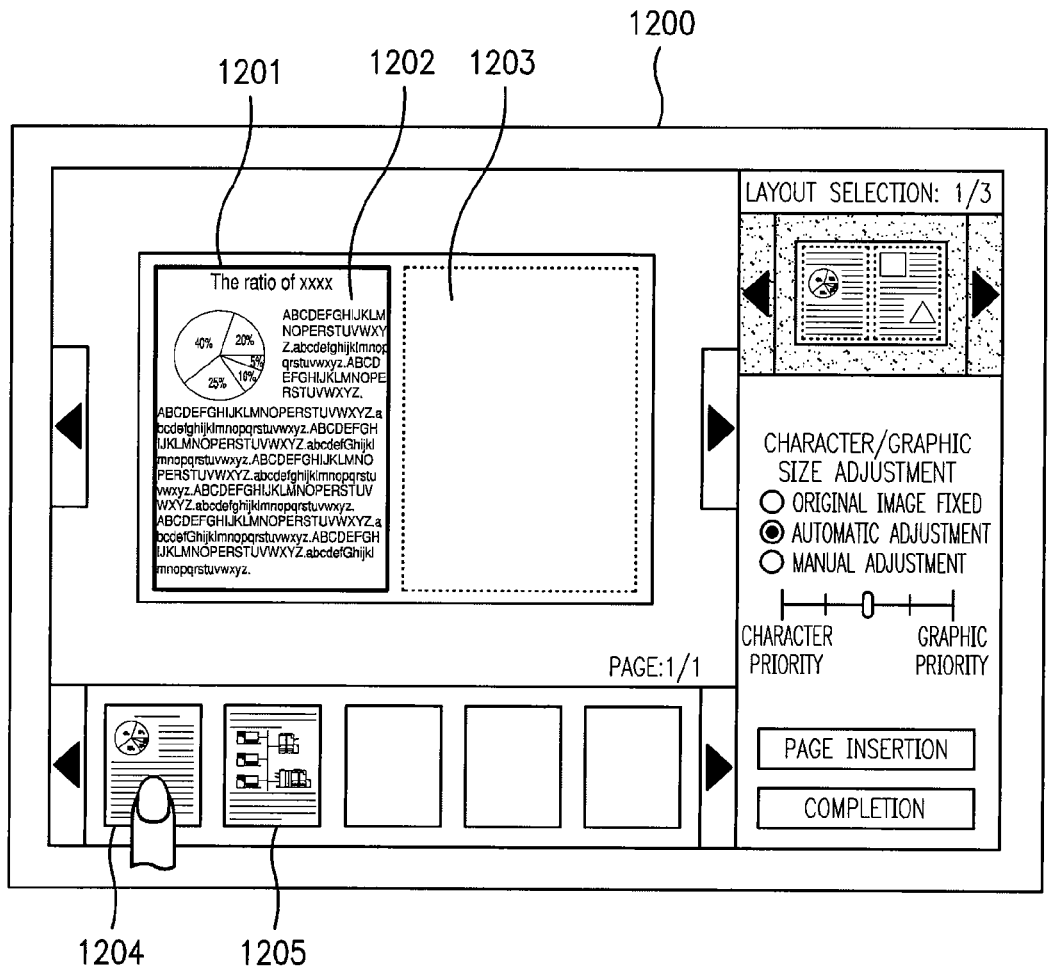
FIG. 12 shows a screen example for illustrating an operation procedure of determining a print layout.
Figure 13:
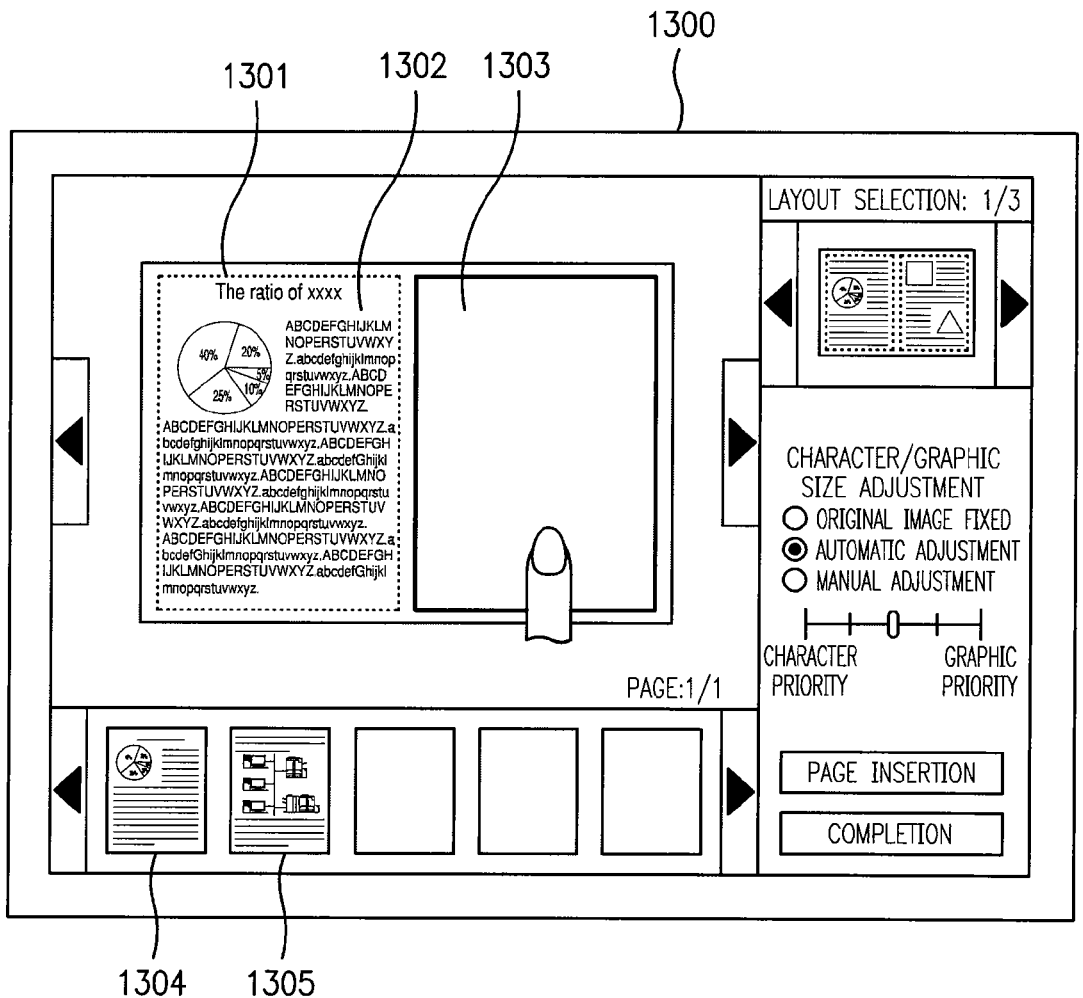
FIG. 13 shows a screen example for illustrating an operation procedure of determining a print layout.
Figure 14:
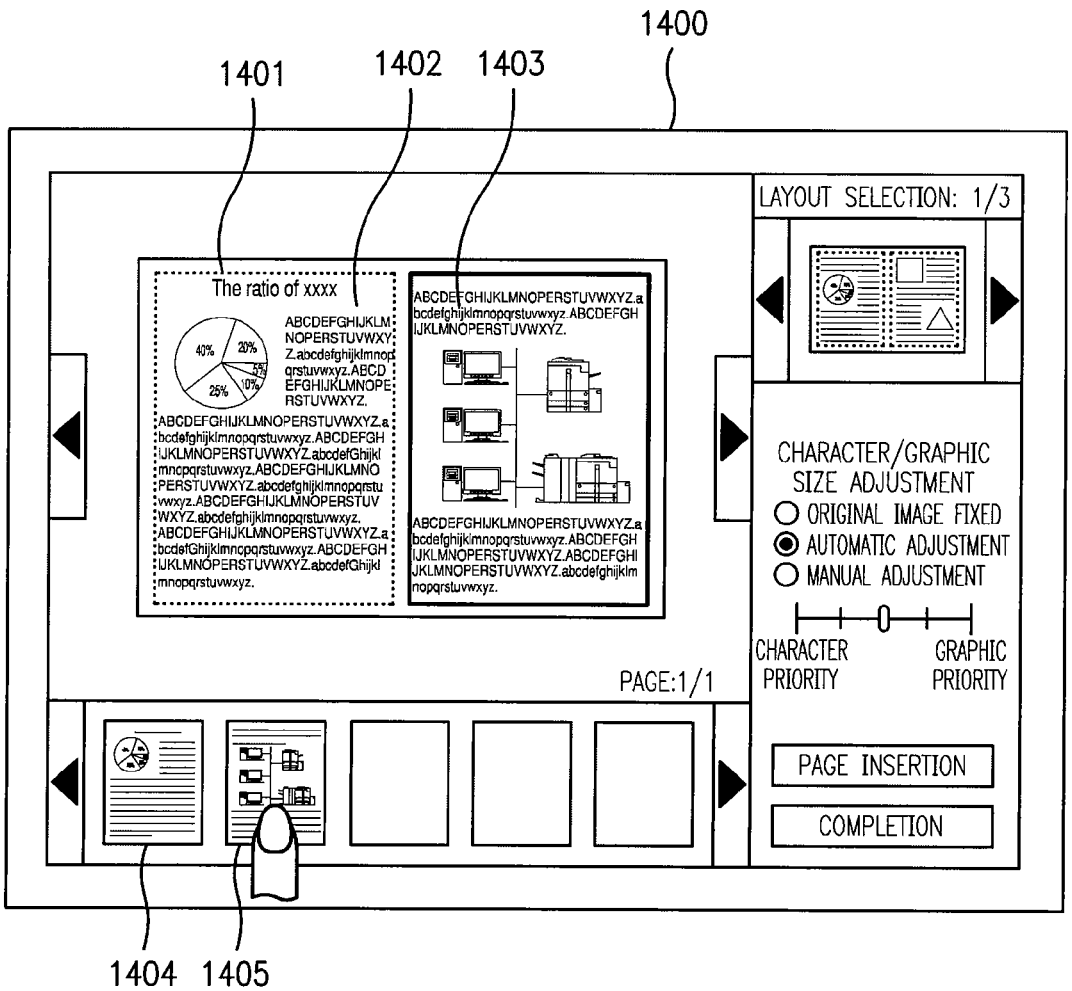
FIG. 14 shows a screen example for illustrating an operation procedure of determining a print layout.

For example, the left page 1102 of the layout diagram 1101 is selected as shown in FIG. 11, and then a circle graph page 1204 is selected from the page preview as shown in FIG. 12. Then, the circle graph page 1204 is inserted in the left page 1102 in FIG. 11 and the layout diagram 1202 in FIG. 12 is obtained. Next, for example, the right page 1303 of the layout diagram 1301 is selected as shown in FIG. 13, and then the network diagram page 1405 is selected from the page preview as shown in FIG. 14. Then, the network diagram page 1405 is inserted in the right page 1303 in FIG. 13 and the layout diagram 1403 in FIG. 14 is obtained.

Next, the flow of processing by which two pages are combined into one page according to the above operation carried out by a user will be described.

Figure 15:
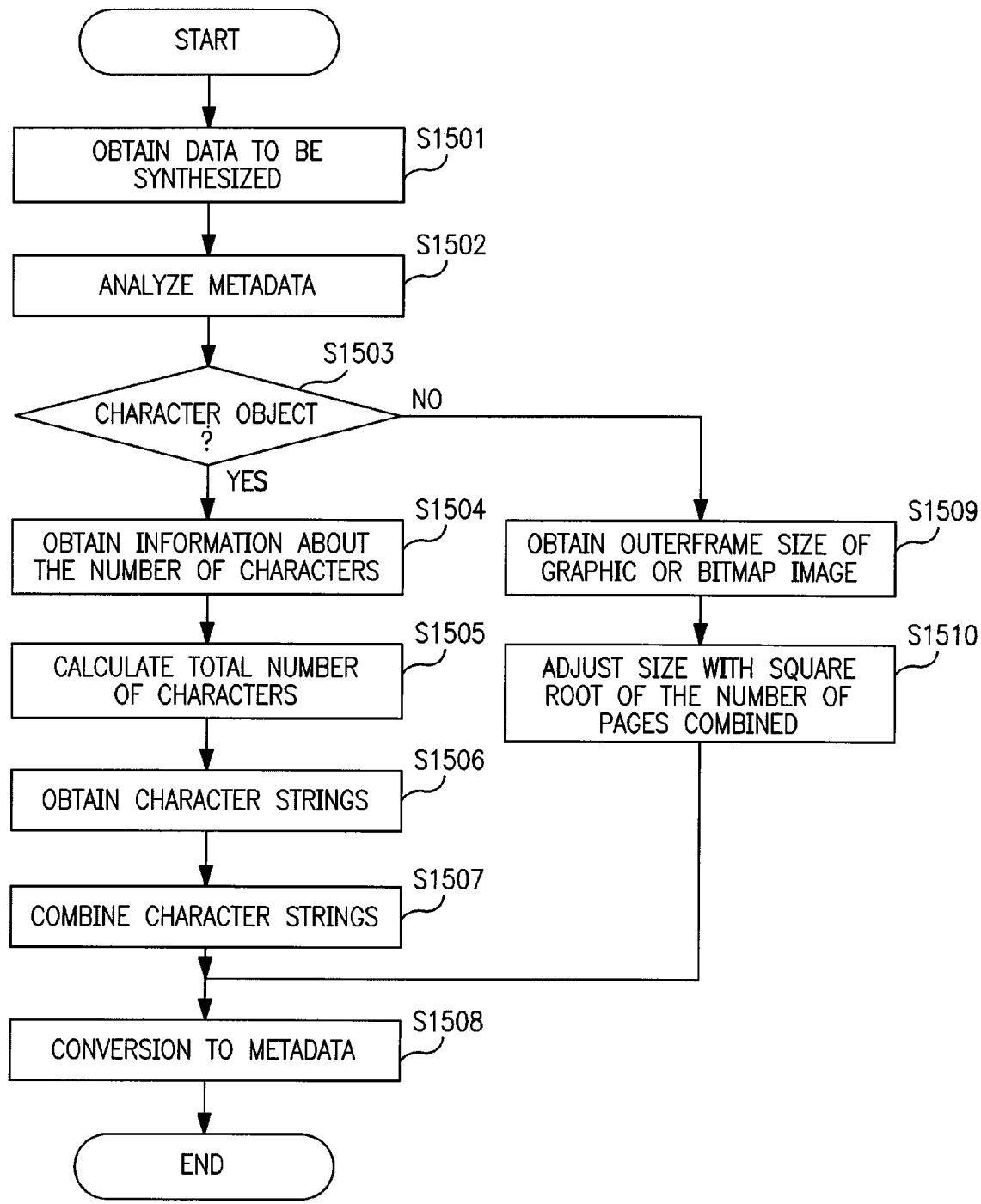
FIG. 15 is a flow chart showing the flow of processing for combining two pages into one page.

FIG. 15 is a flow chart showing the flow of this processing.

In step S1501, the Image processing apparatus 104 obtains data to be synthesized (two pieces of page data which will be synthesized).

In step S1502, the Image processing apparatus 104 analyzes metadata of the obtained data to be synthesized.

In step S1503, the Image processing apparatus 104 determines whether or not the metadata relates to a character object, and proceeds to the processing of step S1504 when determining that it relates to the character object.

In step S1504, the Image processing apparatus 104 obtains the number of characters of each page from the metadata.

Figure 16:
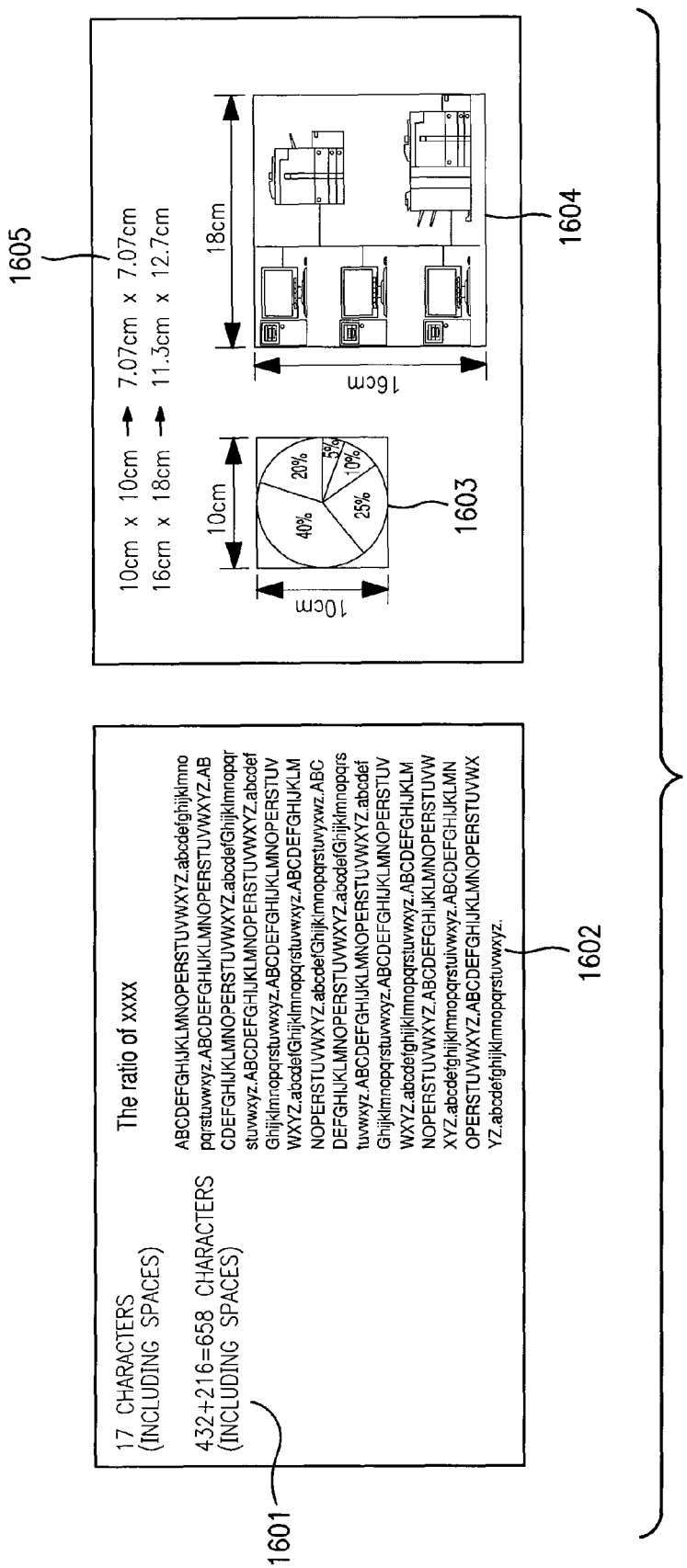
FIG. 16 shows a data structure.

In step S1505, the Image processing apparatus 104 obtains the total number of characters of two pages to be synthesized (1601 of FIG. 16).

In step S1506, the Image processing apparatus 104 obtains character strings of each page from the metadata.

In step S1507, the Image processing apparatus 104 combines the character strings of all pages to be synthesized to obtain a combined character string (1602 in FIG. 16).

On the other hand, when determining that the metadata relates to a graphic object or an bitmap image object in step S1503, the Image processing apparatus 104 proceeds to the processing of step S1509.

In step S1509, the Image processing apparatus 104 obtains data of the outer frame size (1605: 10 cm×10 cm or 16 cm×18 cm in FIG. 16) of the graphic or the bitmap image from the metadata.

In step S1510, the Image processing apparatus 104 adjust the vertical and horizontal sizes by dividing them by the square root of the number of pages to be combined (1605: 7.07 cm×7.07 cm or 11.32 cm×12.7 cm in FIG. 16).

In step S1508, the image processing apparatus 104 converts each of the total number of characters 1601, the combined character string 1602, and the adjusted outer frame size of the graphic or the bitmap image 1605 to metadata. In other words, new metadata is generated from data of the graphic or the bitmap image which has been adjusted in size to form first metadata, and new metadata is generated from data of the combined character string to form second metadata. Also, when multiple pages such as four pages are combined into one page, similar processing is performed.

Next, an operation procedure of scaling and adjusting sizes of characters, graphics, and bitmap image s in a synthetic image which has been generated by combining multiple images to change the layout using a GUI will be described with reference to the drawings.

Figure 17:
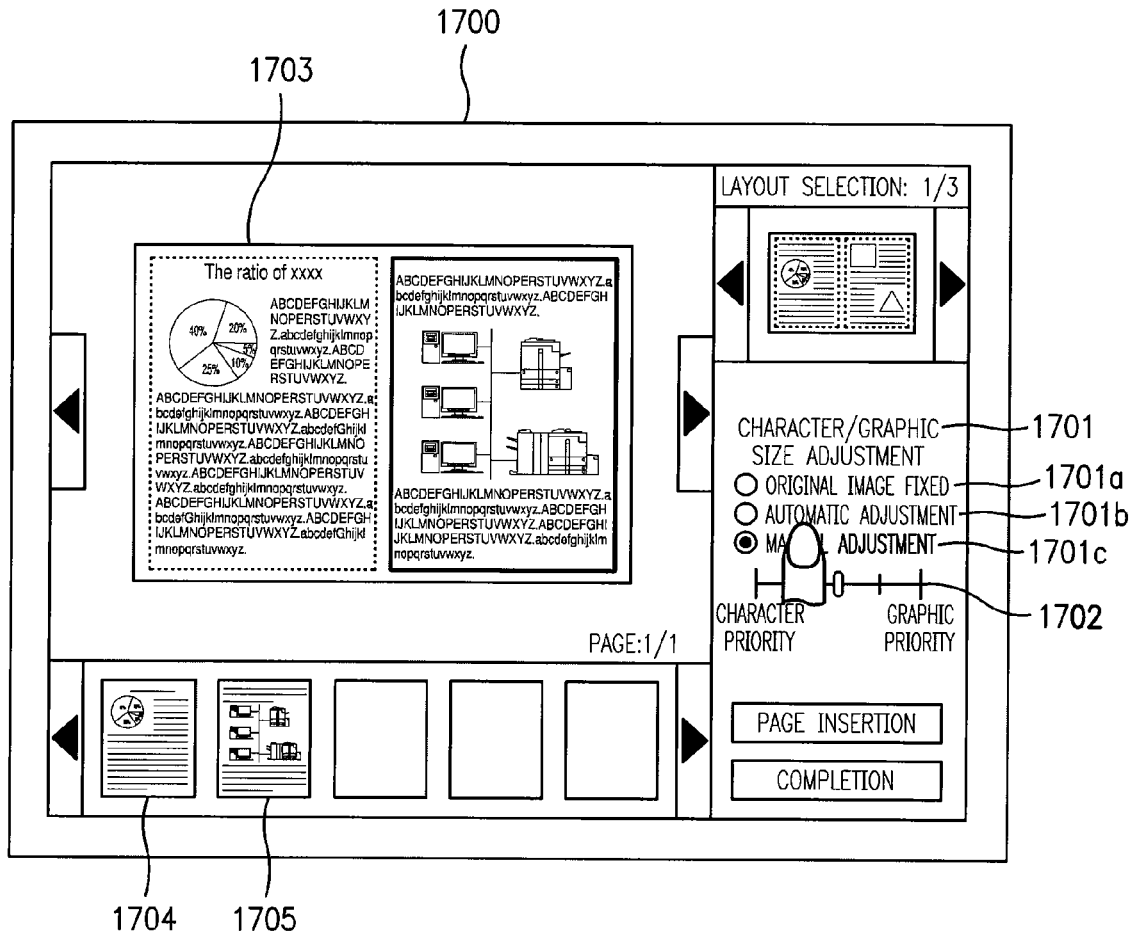
FIG. 17 shows a screen example for illustrating an operation procedure of scaling and adjusting the sizes of characters and graphics/bitmap images.

FIG. 17 shows a screen example of the GUI.

With reference to FIG. 17, a user selects a method of adjusting sizes of characters and graphics by operating radio buttons 1701a, 1701b, and 1701c for adjusting the sizes of characters and graphics. Selecting a method of adjusting sizes of characters and graphics is roughly to select enlarged display of characters with reduced display of graphics, or, conversely, select reduced display of characters with enlarged display of graphics. For example, when the radio button 1701a is checked, "original image fixed" is selected and the above adjustment is not made. When the radio button 1701b is checked, "automatic adjustment" is selected and the above adjustment is automatically made. When the radio button 1701c is checked, "manual adjustment" is selected and a user may make the above adjustment manually by operating the slide bar 1702.

When "manual adjustment" is selected and the slide bar 1702 is slid to the left side (character-priority side), setting is made so that the character display size is increased while the graphic display size is reduced. In contrast to this, when the slide bar 1702 is slid to the right side (graphic-priority side), setting is made so that the graphic display size is increased while the character display size is reduced. In this way, by sliding the slide bar 1702 right and left, the size of any one of the objects can be enlarged and the size of the other one can be reduced.

Sliding the slide bar 1702 to the left end means that the priority of character display is maximized, while sliding it to the right end means that the priority of graphic display is maximized.

Figure 18:
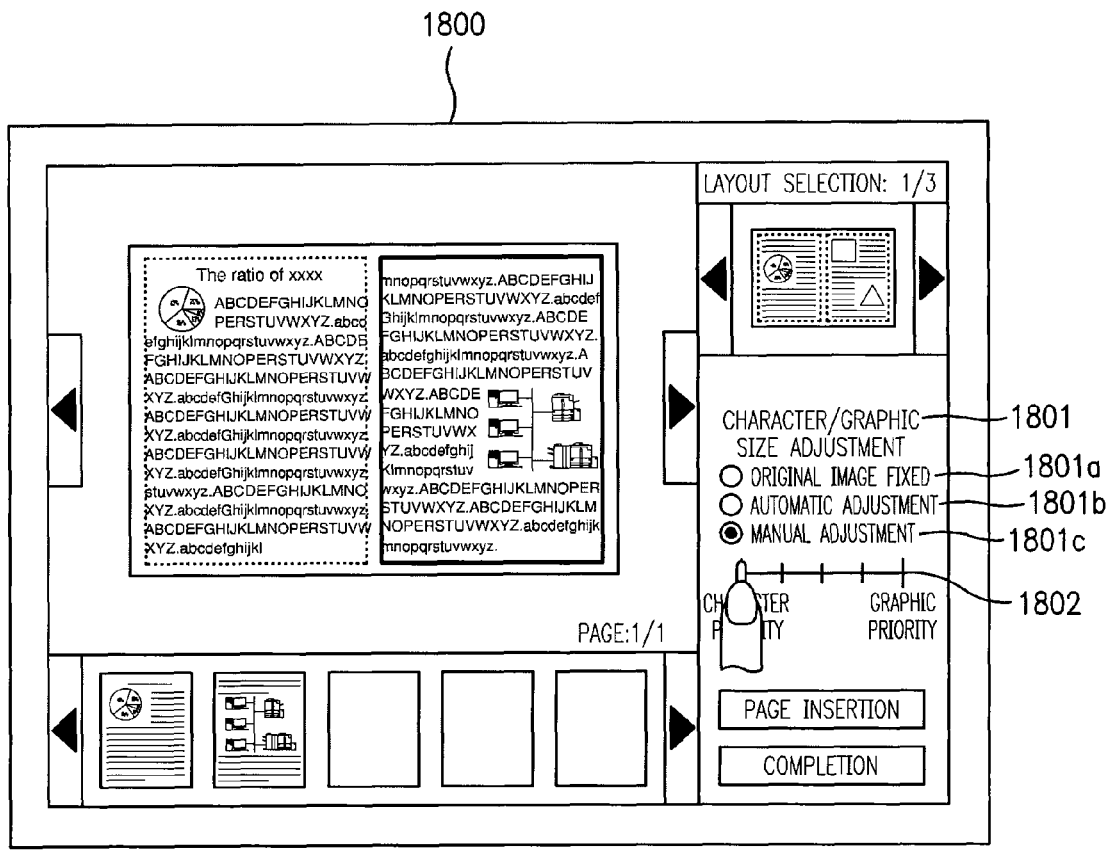
FIG. 18 shows a screen example in the case that a priority of character display is maximized by sliding a slide bar 1702 to the left end in a manual adjustment mode.

FIG. 18 shows a screen example in the case that the priority of character display is maximized by sliding the slide bar 1702 to the left end in the manual adjustment mode.

As shown in FIG. 18, when the slide bar 1802 is slid to the left end, the priority of character display becomes the maximum. As a result, the character display size becomes the maximum within the range where all characters scheduled to be printed are contained in a printable area, and the graphic display size of the circle graph or the network diagram is reduced accordingly.

Next, the flow of processing of adjusting display sizes of characters and graphics (including bitmap image s) according to the above adjustment operation performed by a user will be described.

Figure 19:
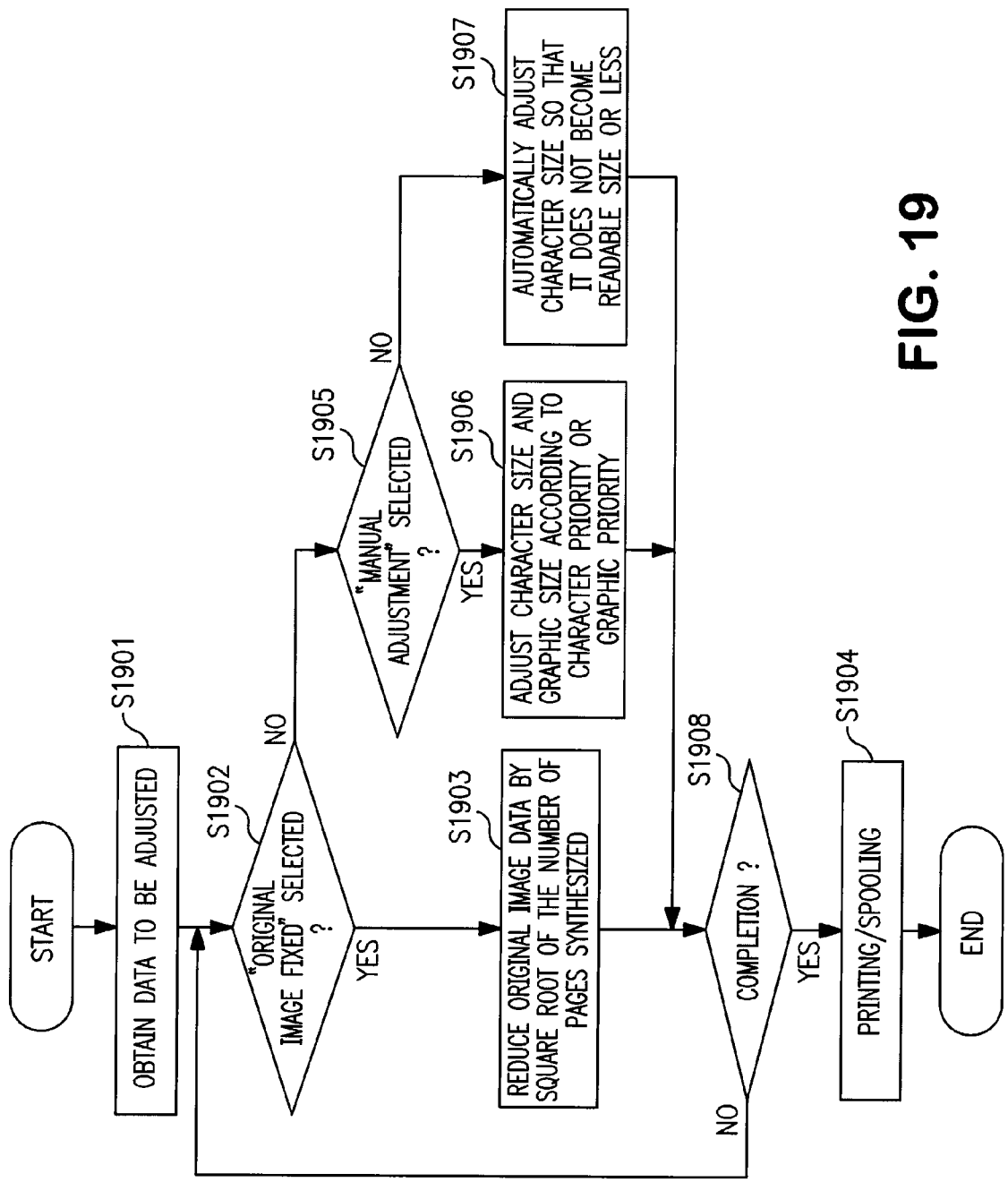
FIG. 19 is a flow chart showing the flow of processing for adjusting the display sizes of characters and graphics (including images)

FIG. 19 is a flow chart showing the flow of this processing.

In step S1901, the Image processing apparatus 104 obtains data to be adjusted. Data to be adjusted means original image data like 1704 or 1705.

In step S1902, the Image processing apparatus 104 determines whether or not the radio button 1701a of "original image fixed" has been checked and "original image fixed" has been selected, and proceeds to the processing of step S1903 when it has been selected.

In step S1903, the Image processing apparatus 104 reduces the sizes of the original images 1704 and 1705 by the square root of the number of pages to be combined and lays out them in one page. The result is displayed like 1703.

On the other hand, when "original image fixed" has not been selected in step S1902, the Image processing apparatus 104 proceeds to the processing of step S1905.

In step S1905, the Image processing apparatus 104 determines whether or not the radio button 1701c of "manual adjustment" has been checked and "manual adjustment" has been selected, and proceeds to the processing of step S1906 when it has been selected.

In step S1906, the Image processing apparatus 104 adjusts the character size and the graphic size according to the position of the slide bar 1702. In this case, the adjustment result is similarly displayed like 1703.

On the other hand, when "manual adjustment" has not been selected, that is, "automatic adjustment" has been selected in step S1905, the Image processing apparatus 104 proceeds to the processing of step S1907.

In step S1907, the Image processing apparatus 104 automatically adjusts the character size and the graphic size so that the character size does not become a readable size or less. The readable size character is a character having a size not less than the readable minimum size of 1 mm in width and 2 mm in height per half-width character when printed. In this case, the adjustment result is similarly displayed like 1703. When "completion" has been selected in step S1908, the Image processing apparatus 104 proceeds to step S1904.

In step S1904, the Image processing apparatus 104 spools data which has been adjusted in size by the processing of step S1903, S1906, or S1907 into the storage device 213. Furthermore, when a readjustment is desired, it is possible to return to step S1902 without selecting "completion" in step S1908 and make a reduction under "adjustment" or "original image fixed".

Next, details of the processing (manual adjustment) of step S1906 in FIG. 19 will be described.

Figure 20:
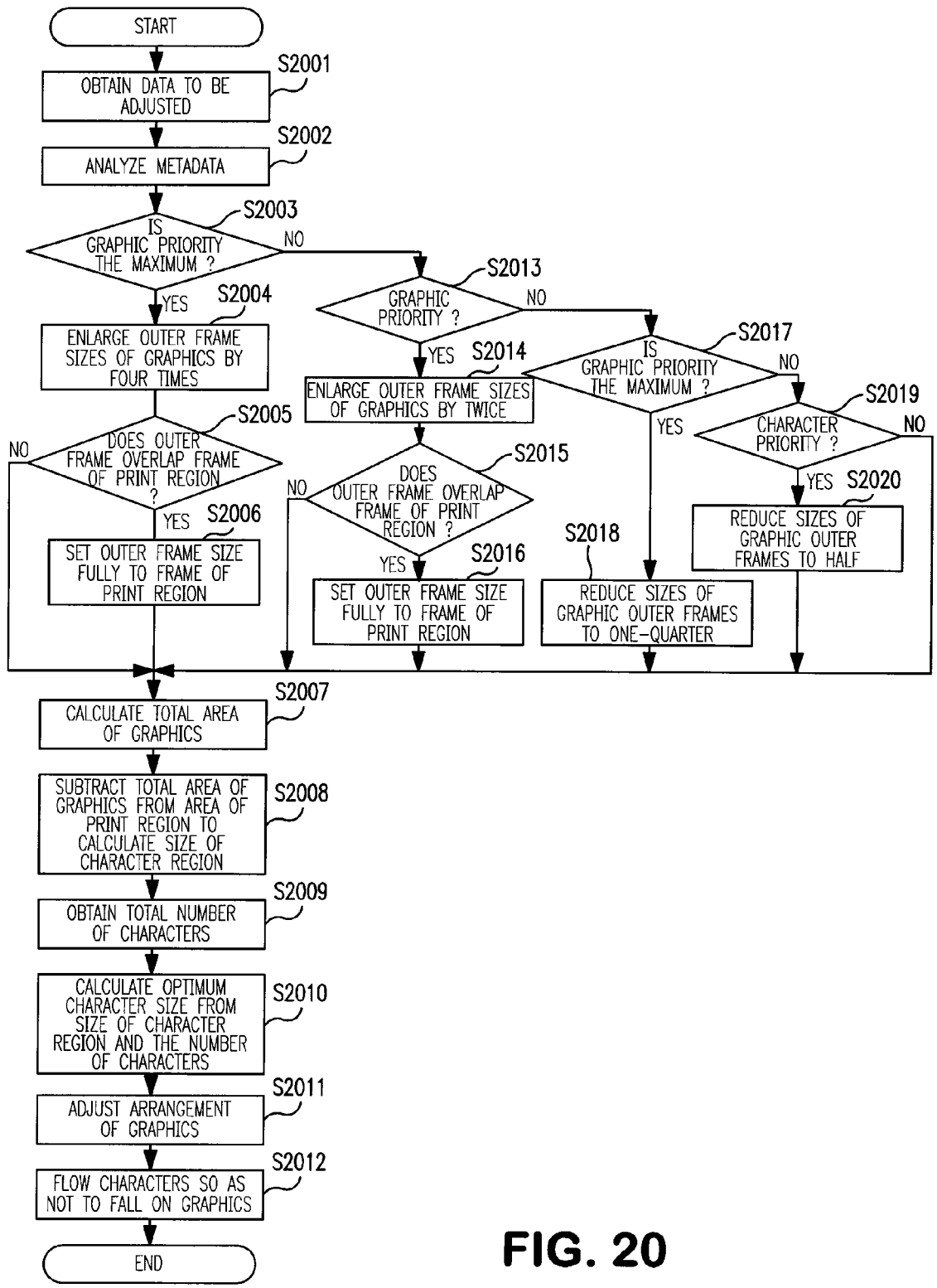
FIG. 20 is a flow chart showing the flow of the processing (processing at manual adjustment) of S1906.

FIG. 20 is a flow chart showing the flow of this processing.

In step S2001, the Image processing apparatus 104 obtains data (objects) to be adjusted.

In step S2002, the Image processing apparatus 104 analyzes metadata included in the data to be adjusted.

In step S2003, the Image processing apparatus 104 determines whether or not the priority of display of graphics (including bitmap images) has been set at the maximum based on the position of the slide bar 1702, and proceeds to the processing of step S2004 when the priority has been set at the maximum.

In step S2004, the Image processing apparatus 104 enlarges the outer frame sizes of the graphics by four times.

In step S2005, the Image processing apparatus 104 determines whether or not the enlarged outer frame of any one of the graphics overlaps the frame of the printable area, and proceeds to the processing of step S2006 when it overlaps the frame of the printable area. In other words, the Image processing apparatus 104 determines whether or not any one of the enlarged graphics protrudes from the printable area in step S2005. The printable area is an area included in the synthetic image.

In step S2006, the Image processing apparatus 104 performs setting to reduce the graphics enlarged in step S2004 so that they are contained exactly in the printable area.

On the other hand, the Image processing apparatus 104 proceeds to the processing of step S2013 when the priority of graphic display has not been set at the maximum as a result of the determination in step S2003.

In step S2013, the Image processing apparatus 104 determines whether or not the slide bar 1702 is positioned on the side giving priority to graphic display, and proceeds to the processing of step S2014 when it is positioned on the side giving priority to graphic display.

Figure 26:
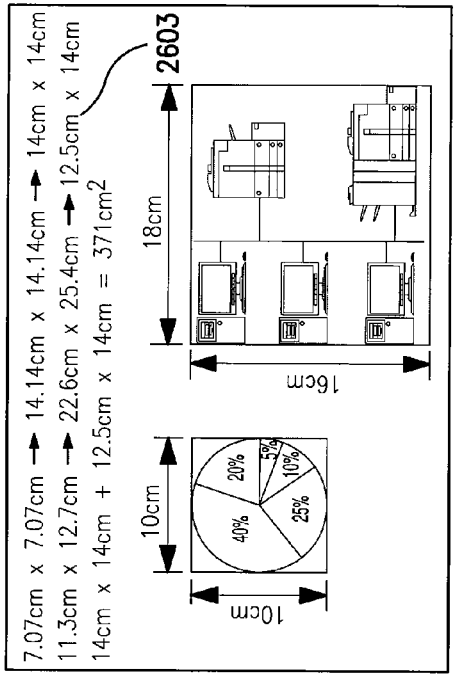
FIG. 26 shows the relation between a character object and a graphic object to be laid out.

In step S2014, the Image processing apparatus 104 enlarges the outer frame sizes of the graphics by twice (2603 in FIG. 26).

In step S2015, the Image processing apparatus 104 determines whether or not the outer frame of any one of the enlarged graphics overlaps the frame of the printable area, and proceeds to the processing of step S2016 when it overlaps the frame of the printable area. In other words, the Image processing apparatus 104 determines whether or not any one of the enlarged graphics protrudes from the printable area in step S2015.

In step S2016, the Image processing apparatus 104 performs setting to reduce the graphics enlarged in step S2014 so that they are contained exactly in the printable area.

On the other hand, the Image processing apparatus 104 proceeds to the processing of step S2017 when the setting of giving priority to graphic display has not been made as a result of the determination in step S2013.

In step S2017, the Image processing apparatus 104 determines whether or not the priority of character display has been set at the maximum based on the position of the slide bar 1702, and proceeds to the processing of step S2018 when it has been set at the maximum.

In step S2018, the Image processing apparatus 104 reduces the vertical and horizontal sizes of the outer frames of the graphics to half. In other words, the Image processing apparatus 104 reduces the areas of the graphics to one-quarter (2203 in FIG. 22).

On the other hand, the Image processing apparatus 104 proceeds to the processing of step S2019 when the priority of character display has not been set to the maximum as a result of the determination in step S2017.

In step S2019, the Image processing apparatus 104 determines whether or not the slide bar 1702 is positioned on the side giving priority to character display, and proceeds to step S2020 when it is positioned on the side giving priority to character display.

In step S2020, the Image processing apparatus 104 reduces the vertical and horizontal sizes of the outer frames of the graphics by a factor of the square root of two. In other words, the Image processing apparatus 104 reduces the areas of the graphics to half.

In step S2007, the Image processing apparatus 104 calculates the total area of the graphics.

Figure 22:
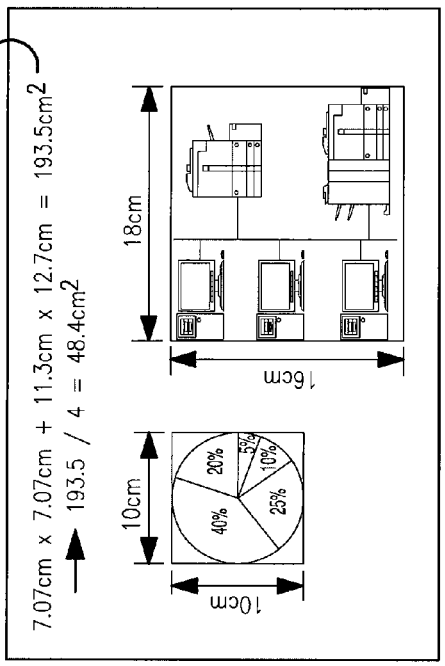
FIG. 22 shows the relation between a character object and a graphic object to be laid out.
Figure 23:
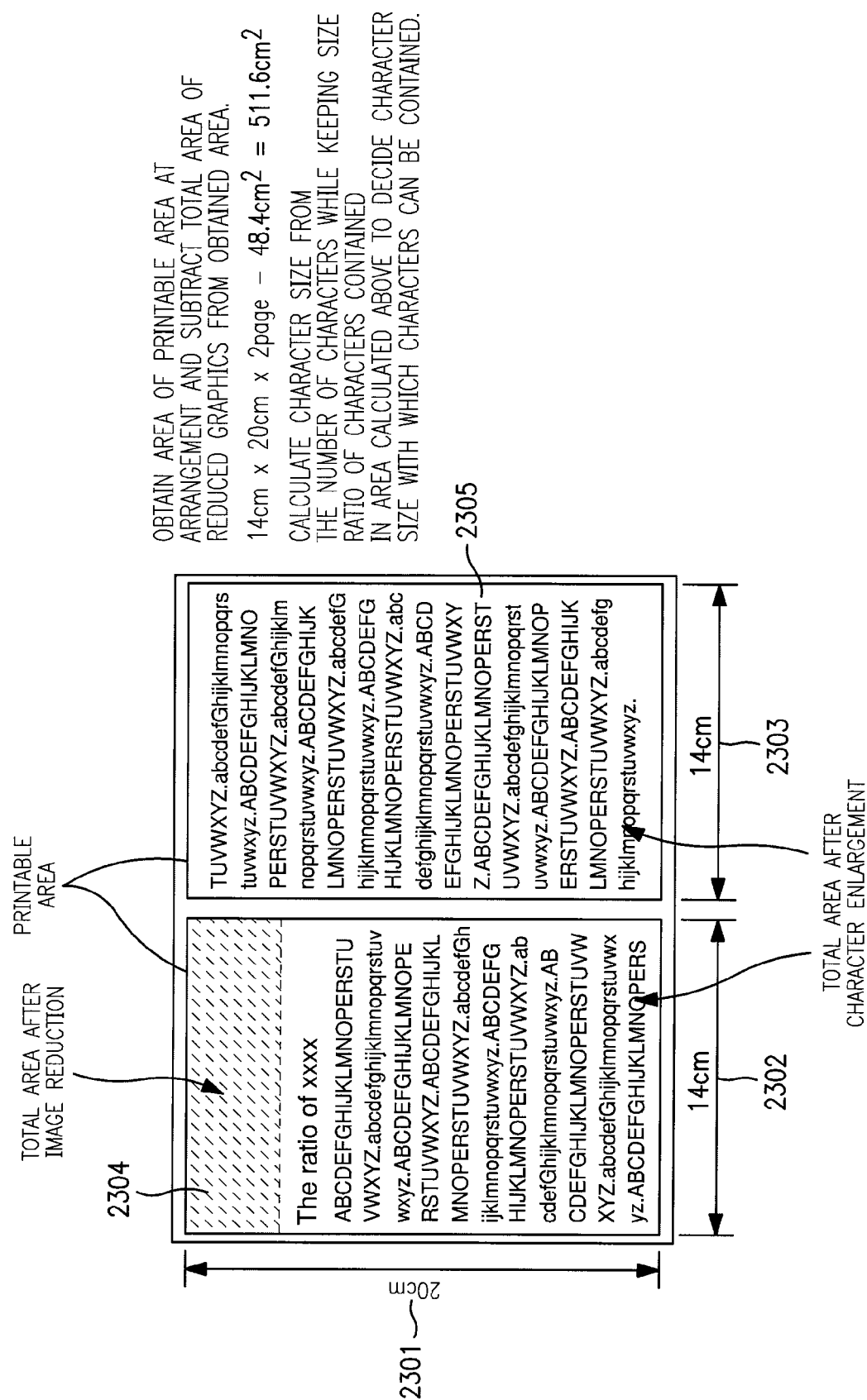
FIG. 23 shows the relation between a character object and a graphic object to be laid out.
Figure 27:
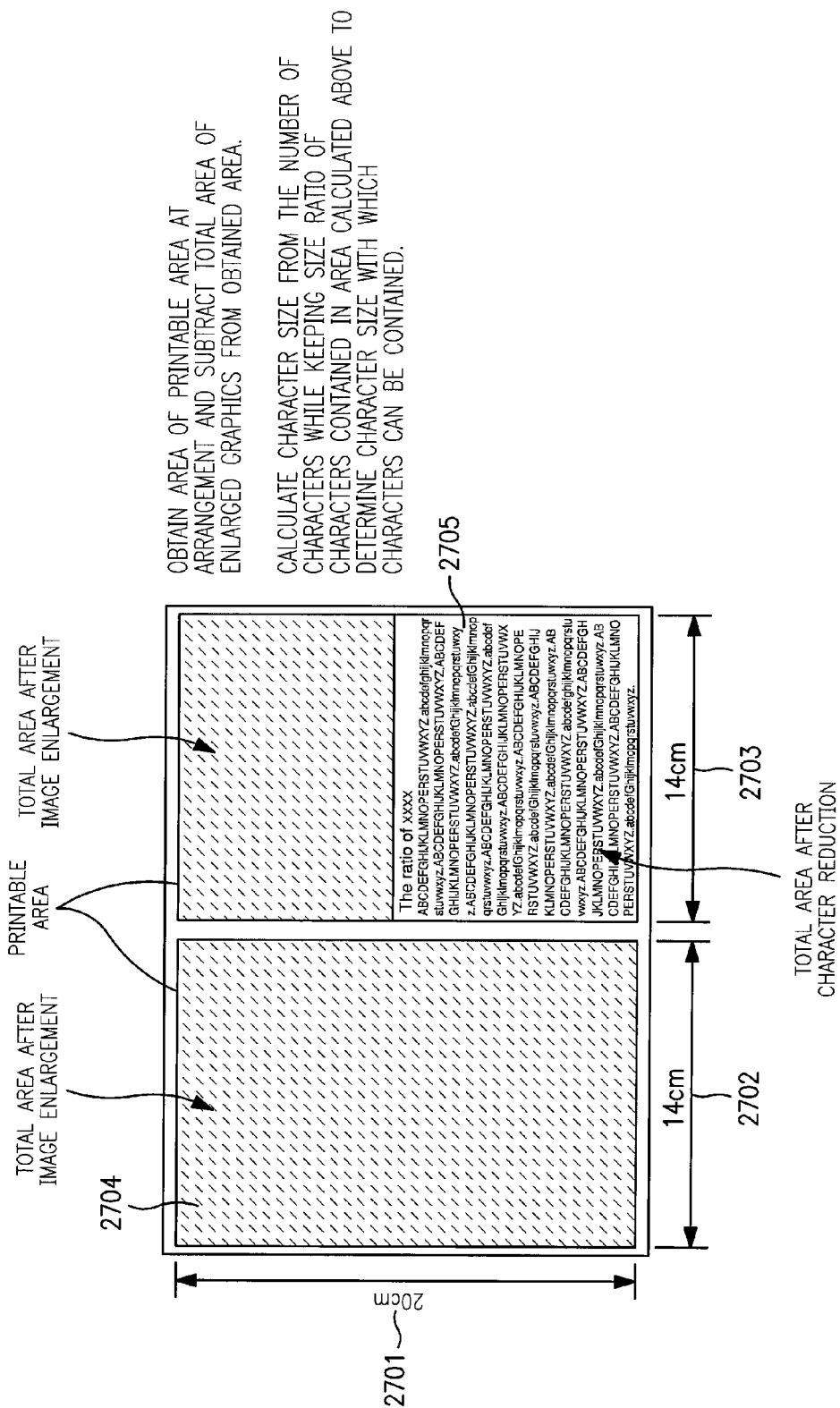
FIG. 27 shows the relation between a character object and a graphic object to be laid out.

In step S2008, the Image processing apparatus 104 calculates the area of the print region using the height of the print region (2301 in FIG. 23 or 2701 in FIG. 27) and the width of the print region (2302 and 2303 in FIG. 23 or 2702 and 2703 in FIG. 27). Then, the Image processing apparatus 104 subtracts the total area of the graphics (2203 in FIG. 22 or 2603 in FIG. 26) from the calculated area of the print region to calculate the size of a character region (2305 in FIG. 23 or 2705 in FIG. 27) where the characters are inserted.

In step S2009, the Image processing apparatus 104 obtains the total number of characters (2201 in FIG. 22 or 2601 in FIG. 26).

In step S2010, the Image processing apparatus 104 calculates an optimum character size from the size of the character region (2305 in FIG. 23 or 2705 in FIG. 27) and the number of characters (2201 in FIG. 22 or 2601 in FIG. 26). An optimum character size is, for example, the largest character size within a range that all characters are contained in a character region where the characters can be printed in a printable area.

Figure 24:
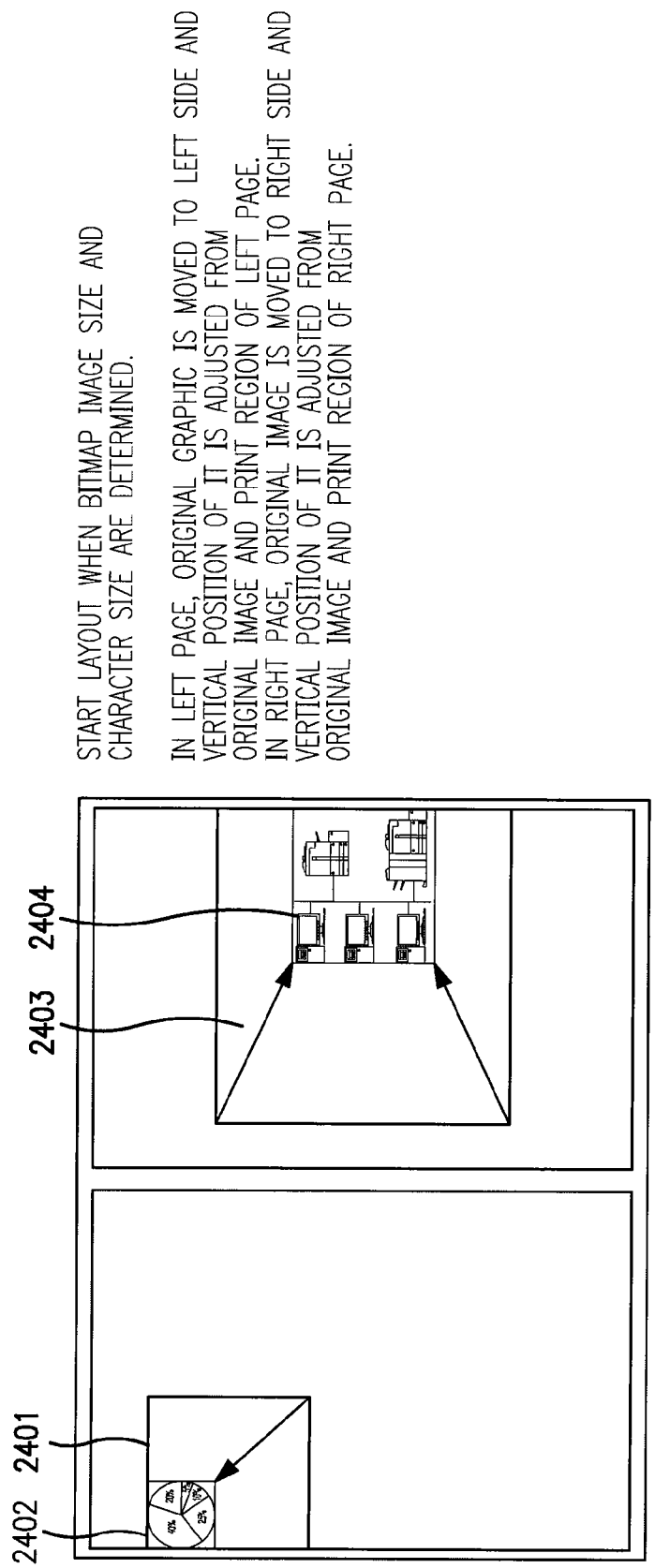
FIG. 24 shows the relation between a character object and a graphic object to be laid out.
Figure 28:
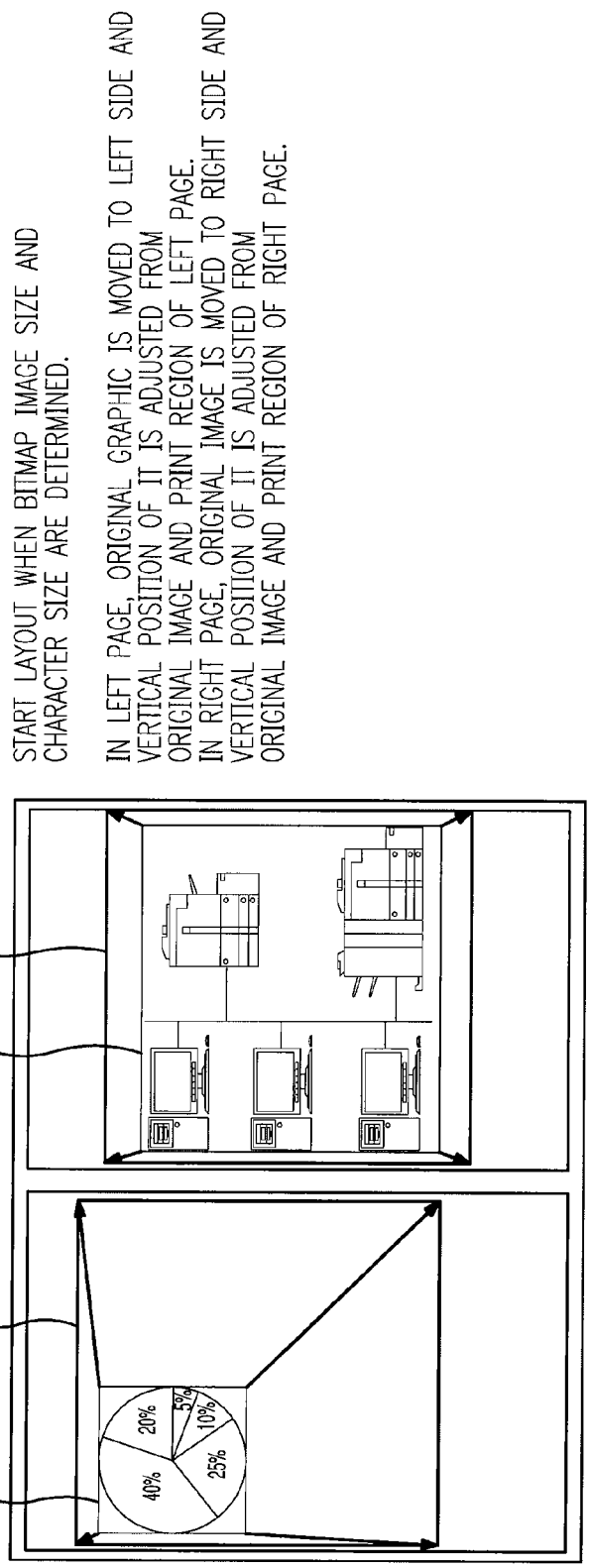
FIG. 28 shows the relation between a character object and a graphic object to be laid out.

In step S2011, the Image processing apparatus 104 adjusts the arrangement of the graphics (2402 and 2404 in FIG. 24 or 2802 and 2804 in FIG. 28).

Figure 25:
FIG. 25 shows the relation between a character object and a graphic object to be laid out.
Figure 29:
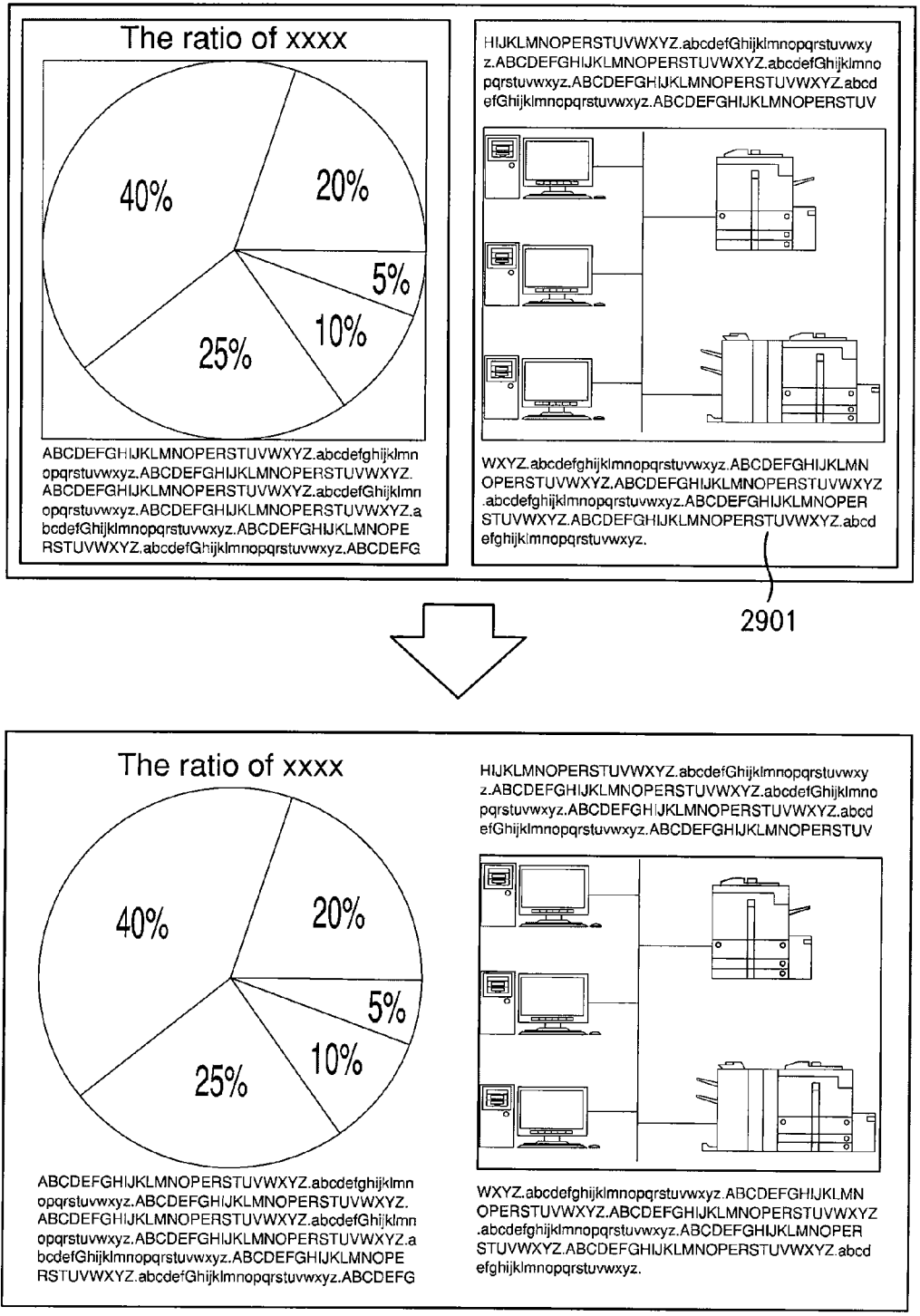
FIG. 29 shows the relation between a character object and a graphic object to be laid out.

In step S2012, the Image processing apparatus 104 lays out the characters so that they do not overlap the graphics (FIG. 25 or FIG. 29).

Next, details of the processing of step S1907 in FIG. 19 will be described.

Figure 21:
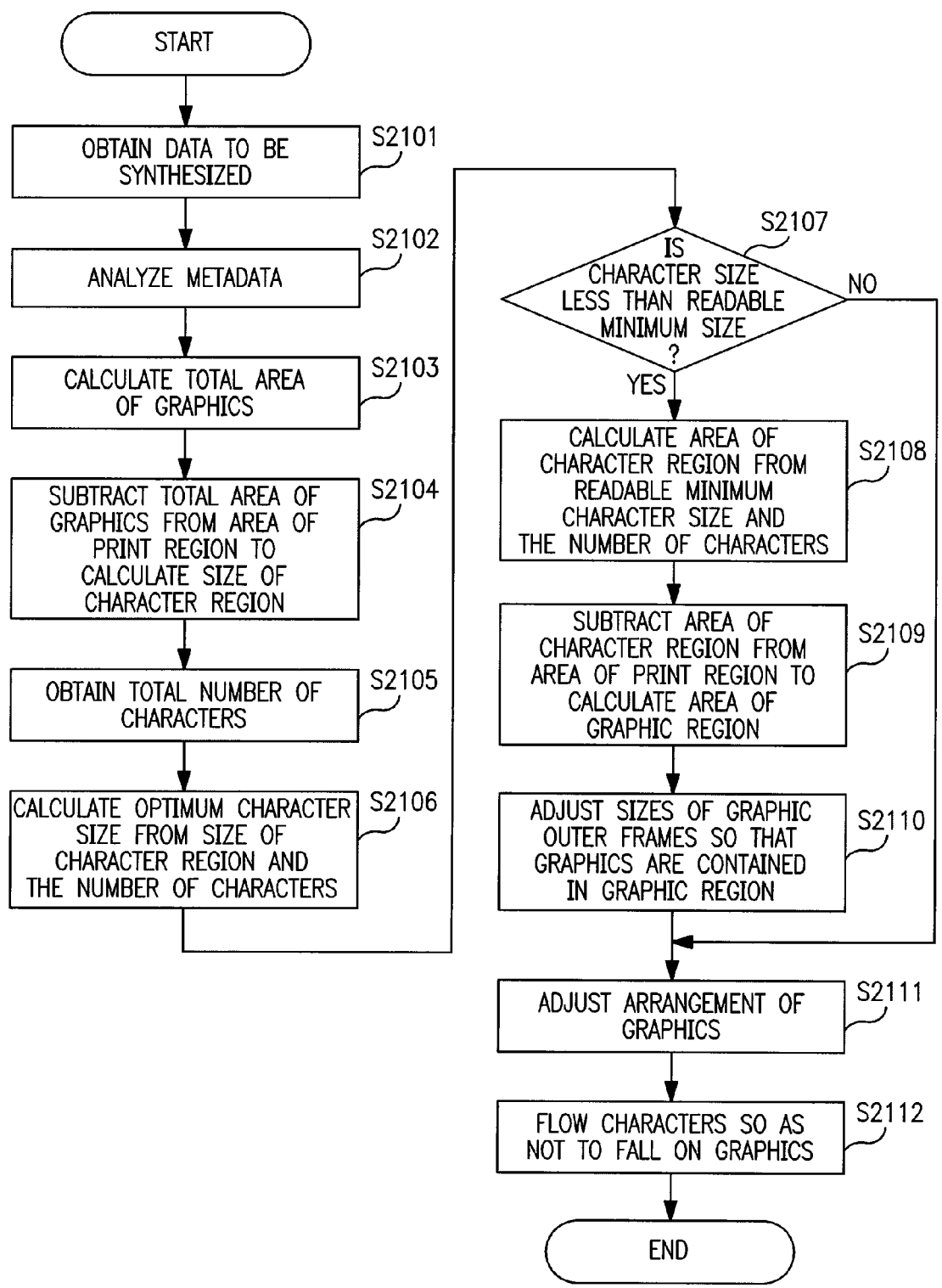
FIG. 21 is a flow chart showing the flow of the processing (processing at manual adjustment) of S1907.

FIG. 21 is a flow chart showing the flow of this processing.

In step S2101, the Image processing apparatus 104 obtains data to be adjusted.

In step S2102, the Image processing apparatus 104 analyzes metadata.

In step S2103, the Image processing apparatus 104 calculates the total area of the graphics (including bitmap images).

In step S2104, the Image processing apparatus 104 subtracts the total area of the graphics from the area of the print region to calculate the size of a character region.

In step S2105, the Image processing apparatus 104 obtains the total number of characters from the metadata.

In step S2106, the Image processing apparatus 104 calculates an optimum character size from the size of the character region and the number of characters.

In step S2107, the Image processing apparatus 104 determines whether or not the character size is less than the readable minimum size which has been set individually for the system, and proceeds to the processing of step S2108 when it is less than the readable minimum size.

In step S2108, the Image processing apparatus 104 calculates the area of a character region from the readable minimum character size and the number of characters.

In step S2109, the Image processing apparatus 104 subtracts the area of the character region obtained in step S2108 from the area of the print region to calculate the area of a graphic region.

In step S2110, the Image processing apparatus 104 adjusts the outer frame sizes of the graphics so that the graphics are contained in the graphic region.

On the other hand, the Image processing apparatus 104 proceeds to the processing of step S2111 when the character size is not less than the readable minimum size which has been set individually for the system as a result of the determination in step S2107.

In step S2111, the Image processing apparatus 104 adjusts the arrangement of the graphics.

In step S2112, the Image processing apparatus 104 lays out the characters so that they do not overlap the graphics.

Next, an operation procedure for combining and laying out two pages in vertically oriented one page using the GUI will be described with reference to the figures.

FIGS. 30 to 35 show screen examples of the GUI.

Figure 30:
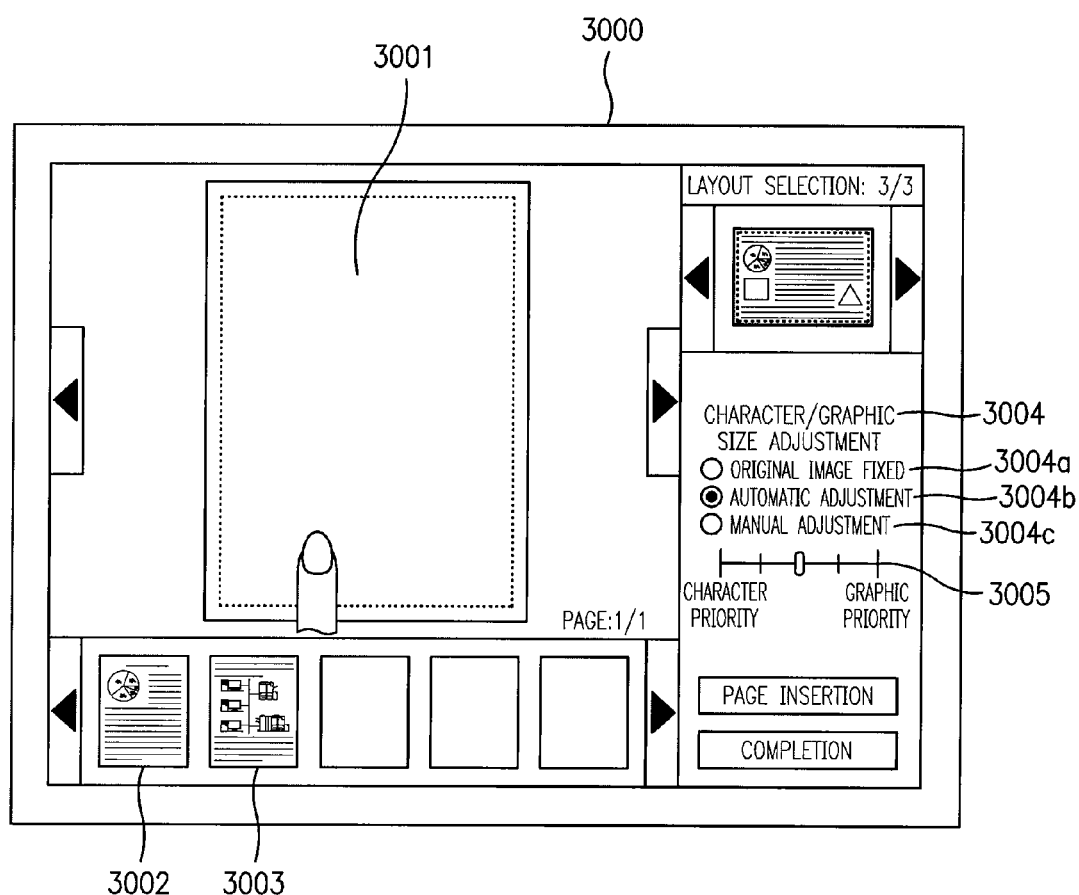
FIG. 30 shows a screen example for illustrating an operation procedure in the case that two pages are combined into one page and laid out in a vertical direction.
Figure 31:
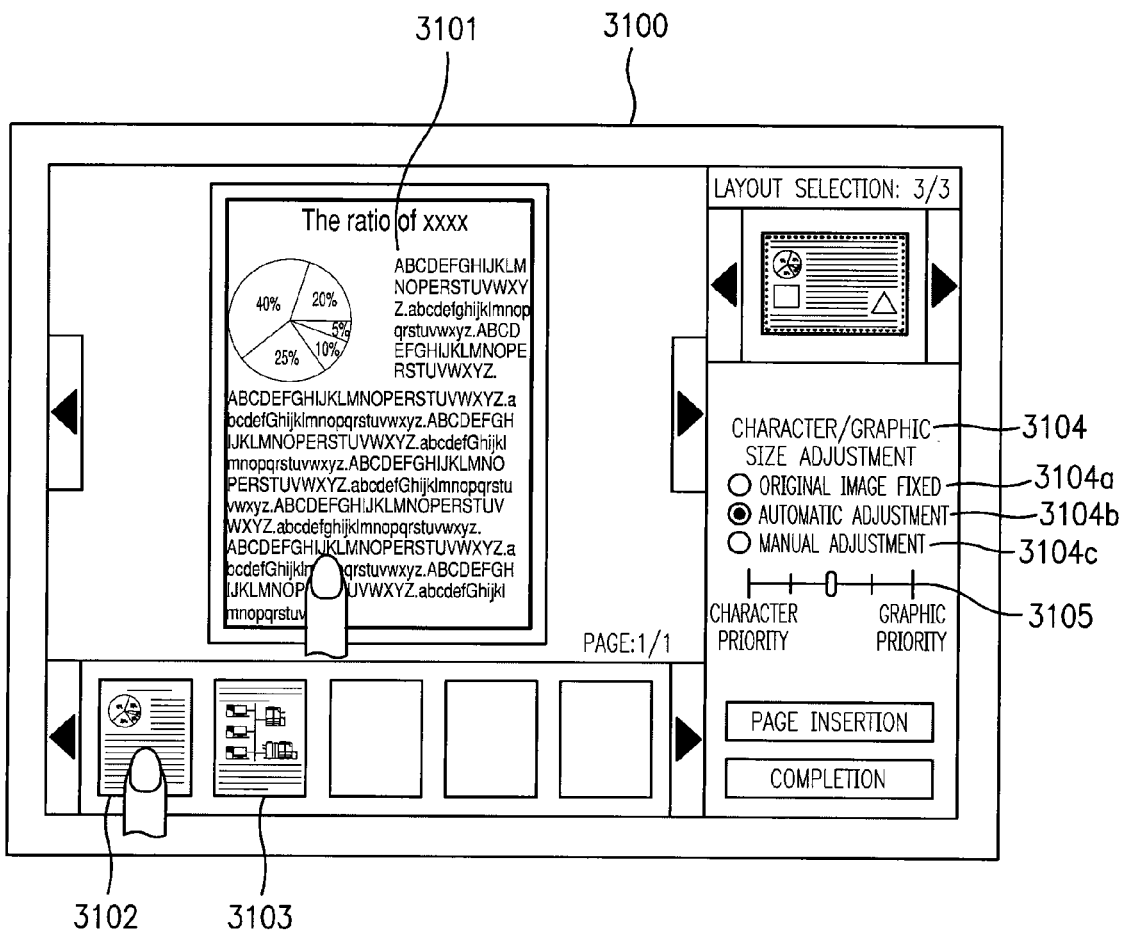
FIG. 31 shows a screen example for illustrating an operation procedure in the case that two pages are combined into one page and laid out in a vertical direction.
Figure 32:
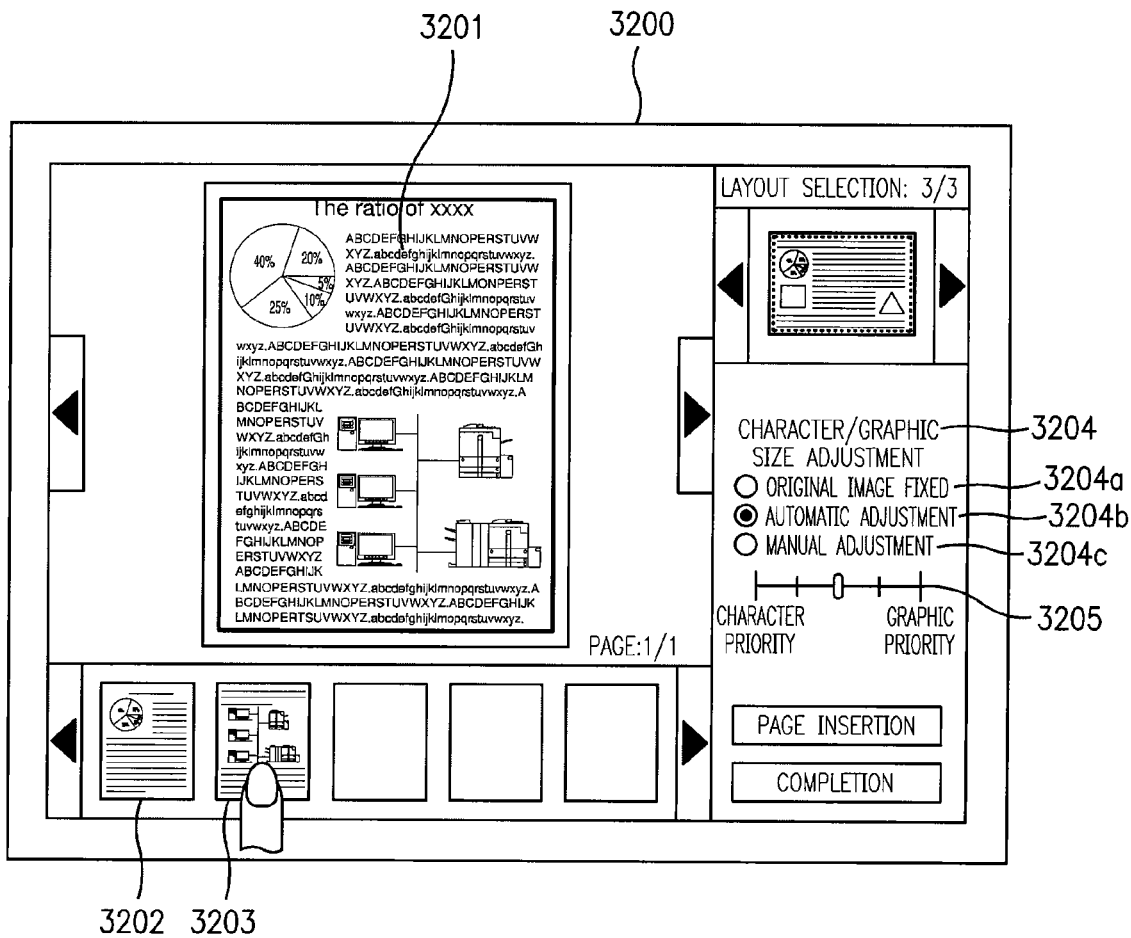
FIG. 32 shows a screen example for illustrating an operation procedure in the case that two pages are combined into one page and laid out in a vertical direction.

In the example shown in FIG. 30, when a page 3001 into which documents are inserted is selected and then a page 3502 to be inserted is selected from the preview, a layout diagram 3101 shown in FIG. 31 is displayed. Next, when a page 3103 to be further added is selected from the preview, a layout diagram 3201 shown in FIG. 32 is displayed. The layout diagram 3201 shows the state that the pages 3202 and 3203 have been reduced and then combined. At that time, the metadata in the print data which has been spooled is also combined. In addition, when "character/graphic size adjustment" 3304 is set at "manual adjustment" 3304c as shown in FIG. 33, the slide bar 3505 becomes active.

Figure 33:
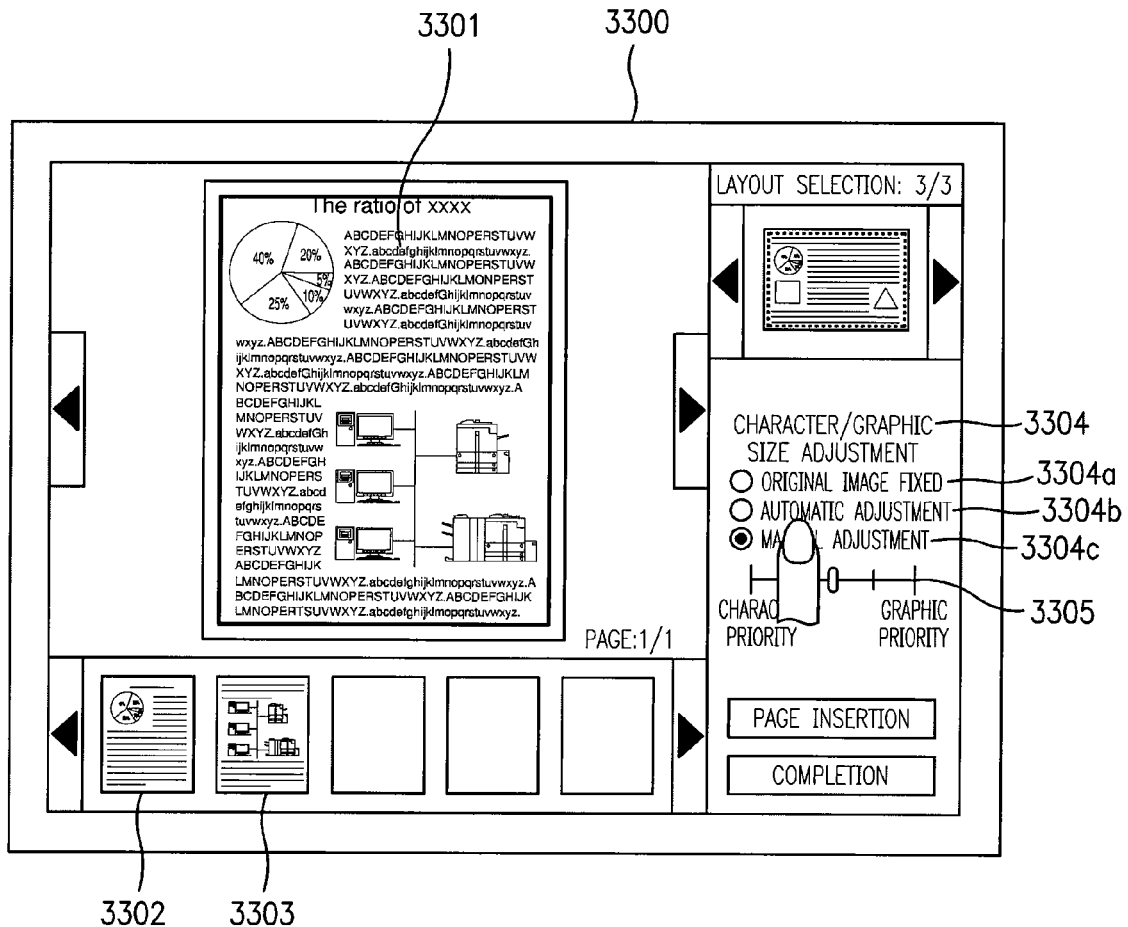
FIG. 33 shows a screen example for illustrating an operation procedure in the case that two pages are combined into one page and laid out in a vertical direction.
Figure 34:
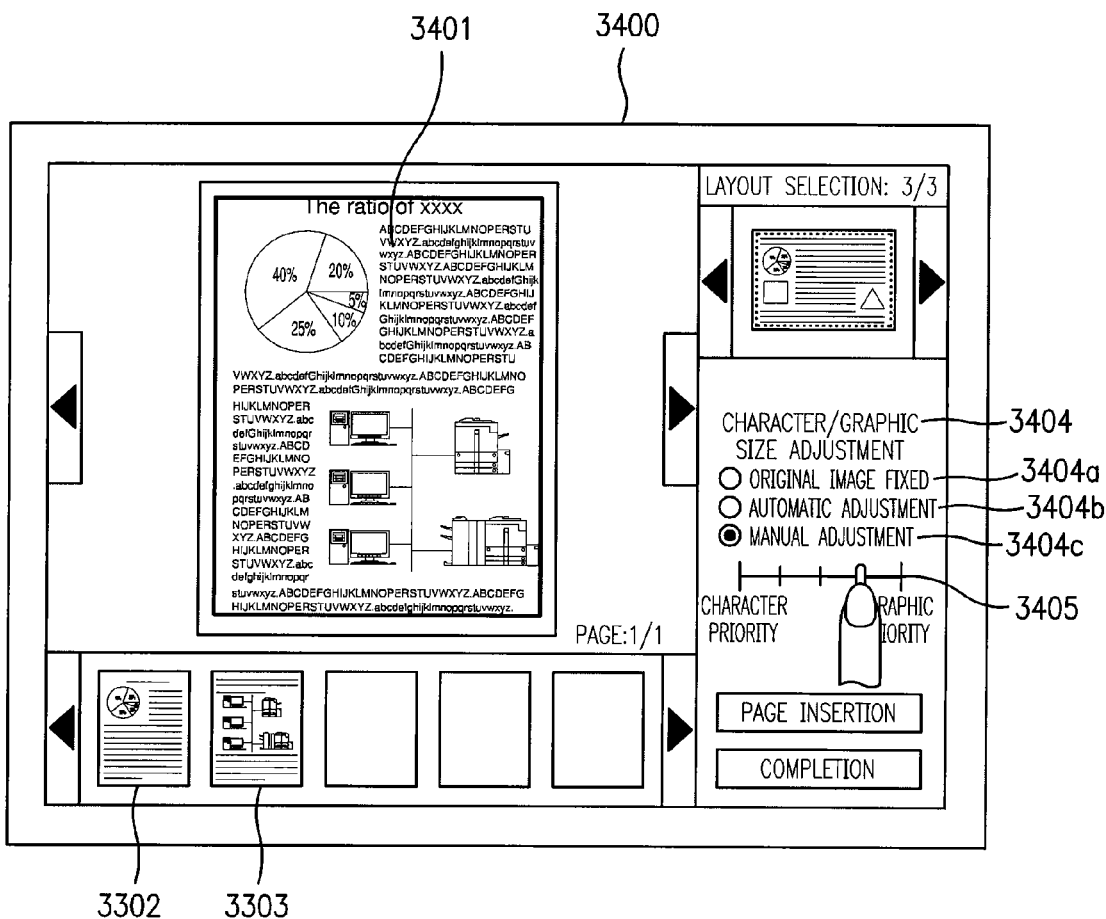
FIG. 34 shows a screen example for illustrating an operation procedure in the case that two pages are combined into one page and laid out in a vertical direction.
Figure 35:
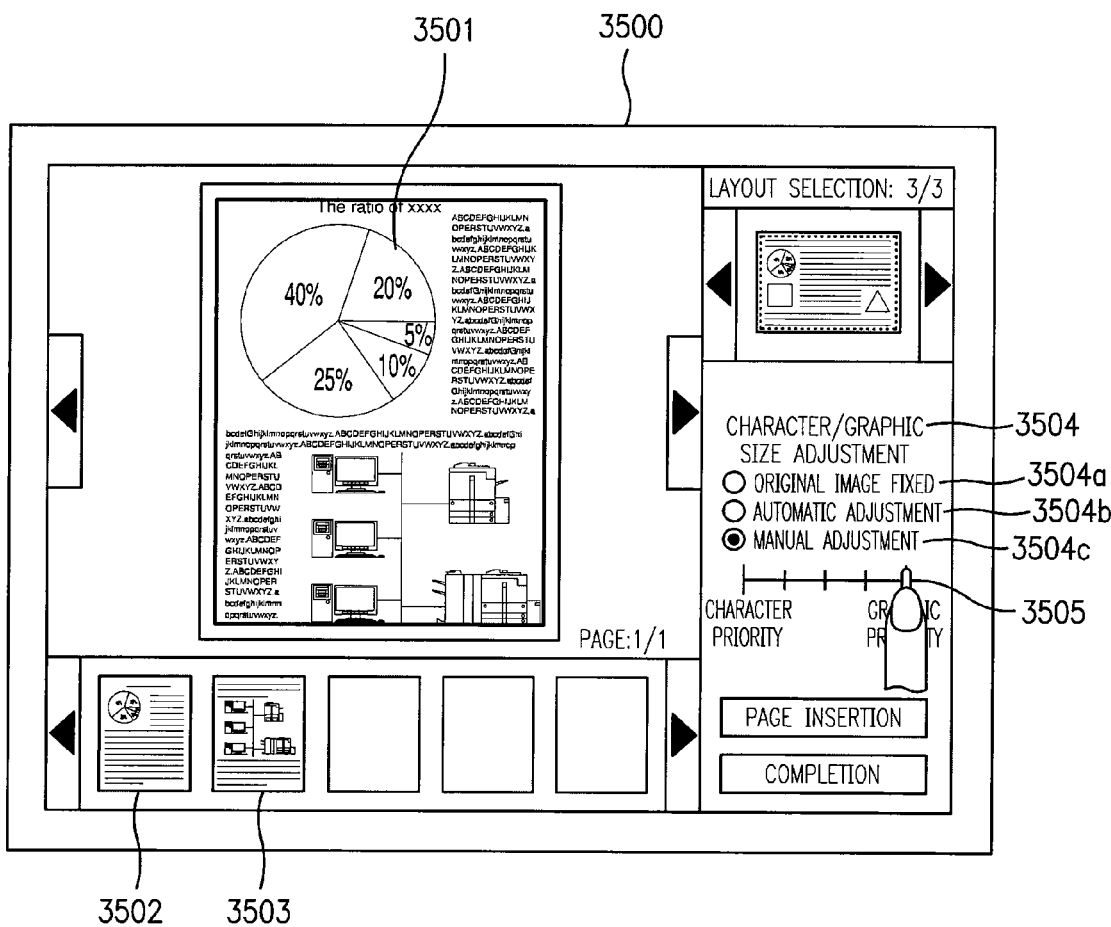
FIG. 35 shows a screen example for illustrating an operation procedure in the case that two pages are combined into one page and laid out in a vertical direction.

When the slide bar 3305 is slid to the right side (graphic priority side) in FIG. 33, the layout diagram 3301 shown in FIG. 33 becomes like the layout diagram 3401 shown in FIG. 34. In other words, setting is made so that when the slide bar 3305 is slid to the right side (graphic priority side), the graphics in the page are enlarged while the characters are reduced. When the priority of graphic display is maximized by further sliding the slide bar 3405 to the right end, the layout diagram 3401 becomes like the layout diagram 3501 shown in FIG. 35. In other words, the graphics in the page are further enlarged while the characters are further reduced. The data for which layout has been adjusted like this is spooled in the storage device.

OTHER EMBODIMENTS

The present invention is also achieved by mounting a recording medium in which program code of software realizing the functions of the above embodiments is recorded in a system or device and causing a computer of the system or the like to read and execute the program code from the recording medium. The recording medium is a computer-readable recording medium. In this case, the program code itself which has been read from the recording medium realizes the functions of the above embodiments, and the recording medium in which the program code is stored constitutes the present invention. Furthermore, the functions of the above embodiments may be realized by part or all of actual processing which an operating system (OS) or the like running on a computer performs based on instructions of the program code. Furthermore, the above embodiments may be realized by writing the program code read from the recording medium into a function extending card or a function extending unit of a computer and then causing the function extending card or the like to perform part or all of the processing based on instructions of the program code.

When the present invention is applied to the recording medium, program code corresponding to the flow charts described above is stored in the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-032266, filed Feb. 13, 2008, which is hereby incorporated by reference herein in its entirety.

What is claimed is:

1. An image processing apparatus connected to an information processing apparatus, for reducing images to generate a synthetic image having a plurality of printable areas, comprising:

an input unit configured to input image data from the information processing apparatus;

a selection unit configured to select a plurality of image data from the input image data input by the input unit;

a synthesizing unit configured to reduce the plurality of selected image data and to combine the reduced image data in any orientation, thereby generating one synthetic image having a plurality of printable areas;

a display unit configured to display the generated synthetic image on a screen;

a separating unit configured to separate a character object from a graphic object included in the synthetic image;

a metadata generating unit configured to analyze the graphic object to generate metadata including information about an outer frame size of the graphic object;

a determining unit configured to determine a priority of the graphic object relative to the character object included in the synthetic image;

a layout changing unit configured to change the layout of the synthetic image based on the generated metadata and the determined priority of the graphic object, the layout changing unit further configured to enlarge the graphic object within one printable area included in the synthetic image in a case where the graphic object has a high priority and to reduce the graphic object in a case where the graphic object has a low priority, wherein the enlarged or reduced graphic object is arranged in the one printable area of the synthetic image and the character object is arranged by changing the size in all the printable areas in the synthetic image except for the one printable area where the graphic object is arranged; and a printing unit configured to print the synthetic image with a changed layout displayed on the screen.

2. The image processing apparatus according to claim 1 further comprising a second metadata generating unit configured to combine a plurality of character objects included in the synthetic image to form one combination character string and generating second data from information obtained by analyzing the combination character string, wherein the layout unit adjusts a size of a character object included in the synthetic image, based on second metadata given to a combination character string by the second data generating unit and a size of a printable area except a region in which the graphic object has been arranged in a region of the synthetic image, and arranges the character object in the printable area.

3. The image processing apparatus according to claim 2, wherein data given to a combination character string generated by the second metadata generating unit includes at least information about a character string included in the combination character string and the number of characters constituting the character string.

4. The image processing apparatus according to claim 1, wherein when the character object is arranged, if a size of characters included in the character object is smaller than a readable minimum size, the size of characters is enlarged and a size of the graphic object is reduced based on the readable minimum size.

5. The image processing apparatus according to claim 1, wherein the layout unit includes means for automatically adjusting a size of characters included in the character object and a size of the graphic object.

6. The image processing apparatus according to claim 5, wherein
the layout unit when automatically adjusting a size of characters included in the character object and a size of the graphic object:
subtracts a size of the graphic object from a printable area included in the synthetic image;
calculates a size of a region in which the character object can be arranged using the subtracted result;
calculates a size of characters included in the character object from a size of a region in which the character object can be arranged and the number of characters included in the character object; and
when the size of characters is smaller than a readable minimum size, enlarges a size of characters included in a combination character string and reduces a size of the graphic object based on the readable minimum size and the number of characters.

7. An image processing method in an image processing apparatus connected to an information processing apparatus, the image processing apparatus reducing images to generate a synthetic image having a plurality of printable areas, the image processing method comprising the steps of:
inputting image data from the information processing apparatus;
selecting a plurality of image data from the input image data input in the inputting step;
reducing the plurality of selected image data and combining the reduced image data in any orientation, thereby generating one synthetic image having a plurality of printable areas;
displaying the generated synthetic image on a screen;
separating a character object from a graphic object included in the synthetic image;
analyzing the graphic object to generate metadata including information about an outer frame size of the graphic object;
determining a priority of the graphic object relative to the character object included in the synthetic image;
changing the layout of the synthetic image based on the generated metadata and the determined priority of the graphic object;
enlarging the graphic object within one printable area included in the synthetic image in a case where the graphic object has a high priority and reducing the graphic object in a case where the graphic object has a low priority, wherein the enlarged or reduced graphic object is arranged in the one printable area of the synthetic image and the character object is arranged by changing the size in all the printable areas in the synthetic image except for the one printable area where the graphic object is arranged; and
printing the synthetic image with a changed layout displayed on the screen.

8. The image processing method according to claim 7 further comprising the step of
combining a plurality of character objects included in the synthetic image to form one combination character string and generating second metadata from information obtained by analyzing the combination character string, wherein
the step of laying out the synthetic image adjusts a size of a character object included in the synthetic image, based on second metadata given to a combination character string by the second metadata generating step and a size of a printable area except a region in which the graphic object has been arranged in a region of the synthetic image, and arranges the character object in the printable area.

9. The image processing method according to claim 8, wherein second metadata given to a combination character string generated by the second metadata generating step includes at least information about a character string included in the combination character string and the number of characters constituting the character string.

10. The image processing method according to claim 7, wherein when the character object is arranged, if a size of characters included in the character object is smaller than a readable minimum size, the size of characters is enlarged and a size of the graphic object is reduced based on the readable minimum size.

11. The image processing method according to claim 7, wherein the step of laying out the synthetic image includes the step of automatically adjusting a size of characters included in the character object and a size of the graphic object.

12. The image processing method according to claim 11, wherein
the step of automatically adjusting a size of characters included in the character object and a size of the graphic object:
subtracts a size of the graphic object from a printable area included in the synthetic image;
calculates a size of a region in which the character object can be arranged using the subtracted result;
calculates a size of characters included in the character object from a size of a region in which the character object can be arranged and the number of characters included in the character object; and
when the size of characters is smaller than a readable minimum size, enlarges a size of characters included in a combination character string and reduces a size of the graphic object based on the readable minimum size and the number of characters.

13. A non-transitory computer-readable medium having computer-executable instructions for performing an image processing method in an image processing apparatus connected to an information processing apparatus, the image processing apparatus of reducing images to generate a synthetic image having a plurality of printable areas, the image processing method comprising the steps of:
selecting a plurality of image data from the input image data input in the inputting step;

reducing the plurality of selected image data and combining the reduced image data in any orientation, thereby generating one synthetic image having a plurality of printable areas;

displaying the generated synthetic image on a screen;

separating a character object from a graphic object included in the synthetic image;

analyzing the graphic object to generate metadata including information about an outer frame size of the graphic object;

determining a priority of the graphic object relative to the character object included in the synthetic image;

changing the layout of the synthetic image based on the generated metadata and the determined priority of the graphic object;

enlarging the graphic object within one printable area included in the synthetic image in a case where the graphic object has a high priority and reducing the graphic object in a case where the graphic object has a low priority, wherein the enlarged or reduced graphic object is arranged in the one printable area of the synthetic image and the character object is arranged by changing the size in all the printable areas in the synthetic image except for the one printable area where the graphic object is arranged; and printing the synthetic image with a changed layout displayed on the screen.

* * * * *